US008730507B2

(12) United States Patent
Muramatsu

(10) Patent No.: US 8,730,507 B2
(45) Date of Patent: May 20, 2014

(54) IMAGE FORMING APPARATUS, METHOD FOR CONTROLLING THE IMAGE FORMING APPARATUS, AND STORAGE MEDIUM

(75) Inventor: Yusuke Muramatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 13/406,296

(22) Filed: Feb. 27, 2012

(65) Prior Publication Data

US 2012/0229847 A1 Sep. 13, 2012

(30) Foreign Application Priority Data

Mar. 10, 2011 (JP) ................................. 2011-052394

(51) Int. Cl.
*G06F 15/00* (2006.01)
(52) U.S. Cl.
USPC ........................................ 358/1.15; 358/1.14
(58) Field of Classification Search
USPC ............... 358/1.13, 1.15, 1.14, 471, 500, 501
See application file for complete search history.

(56) References Cited

U.S. PATENT DOCUMENTS

| 8,368,930 | B2 * | 2/2013 | Matsuura et al. | 358/1.15 |
|---|---|---|---|---|
| 2004/0049741 | A1 * | 3/2004 | Natori | 715/527 |
| 2006/0039022 | A1 * | 2/2006 | Kondo | 358/1.13 |
| 2007/0086794 | A1 * | 4/2007 | Sasaki et al. | 399/16 |
| 2008/0151294 | A1 * | 6/2008 | Natori et al. | 358/1.15 |
| 2010/0245901 | A1 * | 9/2010 | Kitaguchi | 358/1.15 |
| 2011/0302490 | A1 * | 12/2011 | Koarai | 715/274 |
| 2012/0075670 | A1 * | 3/2012 | Yamaguchi | 358/1.15 |
| 2012/0147404 | A1 * | 6/2012 | Kubota et al. | 358/1.13 |
| 2013/0201521 | A1 * | 8/2013 | Tsunekawa | 358/1.15 |

FOREIGN PATENT DOCUMENTS

JP 2004-351872 A 12/2004

* cited by examiner

*Primary Examiner* — Jerome Grant, II
(74) *Attorney, Agent, or Firm* — Canon USA, Inc., IP Division

(57) ABSTRACT

An image forming apparatus includes a generation unit and a preview control unit. The generation unit acquires print information from an input print job and generates a preview image for displaying, on a display unit, a print image of a page to be printed whose print processing by a printing unit is still stoppable. The preview control unit displays the preview image generated by the generation unit on the display unit.

20 Claims, 25 Drawing Sheets

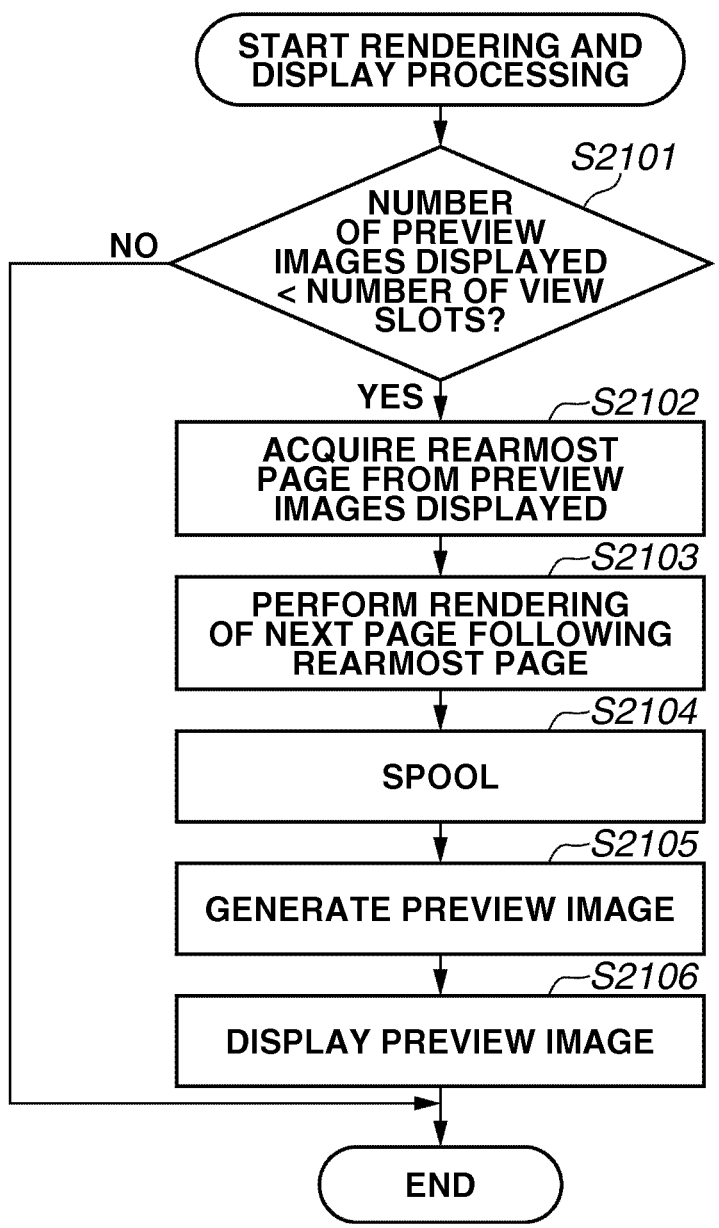

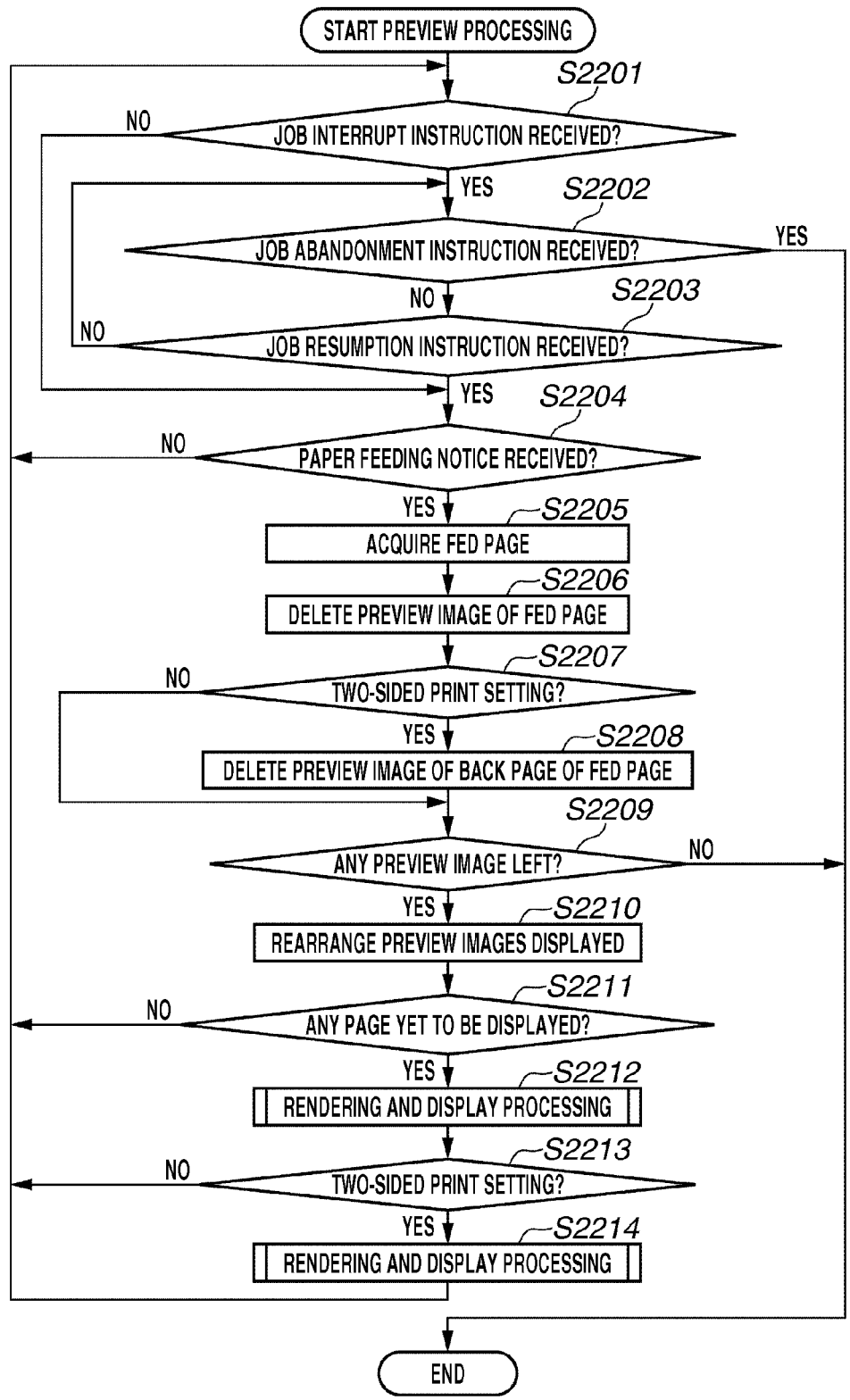

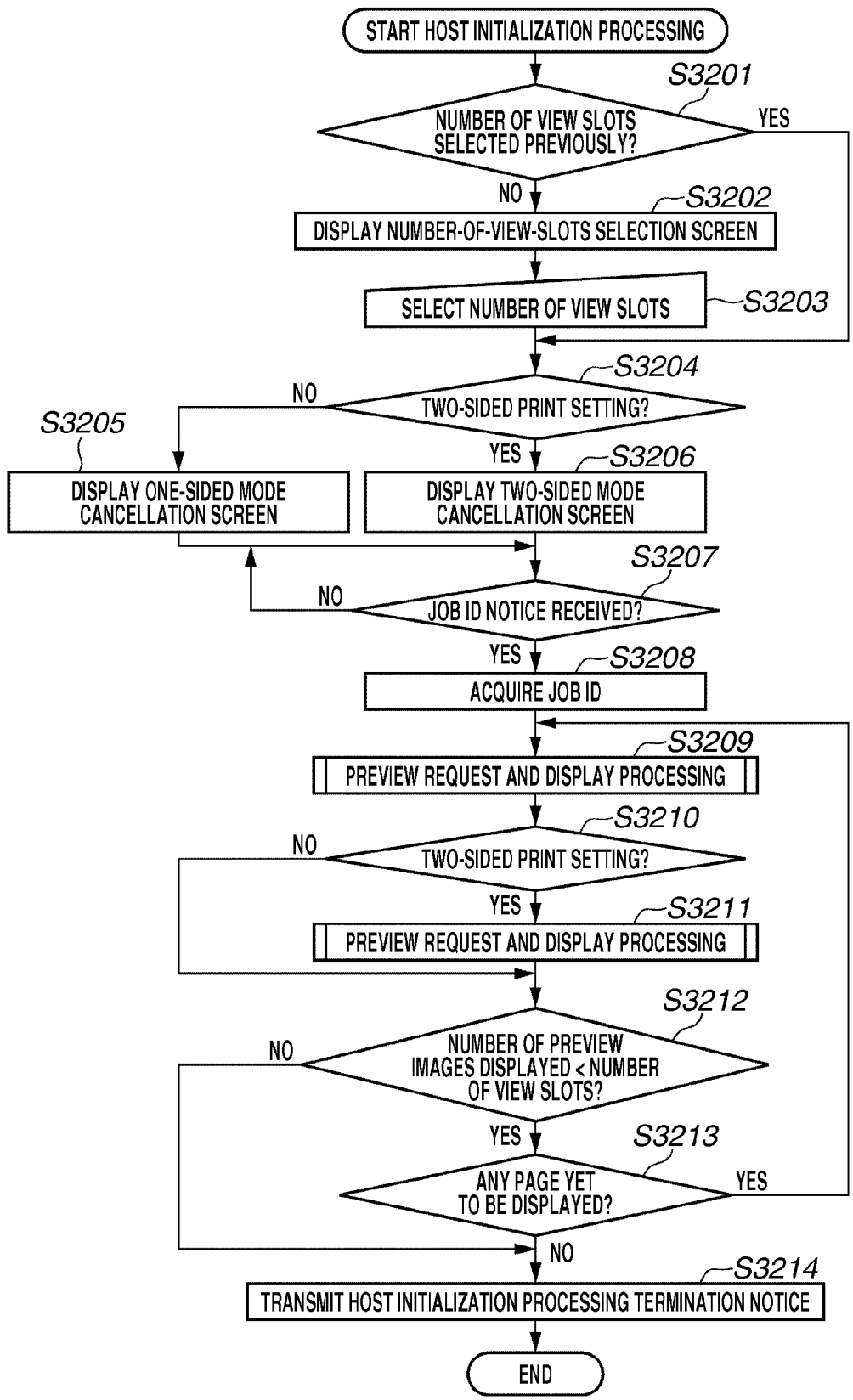

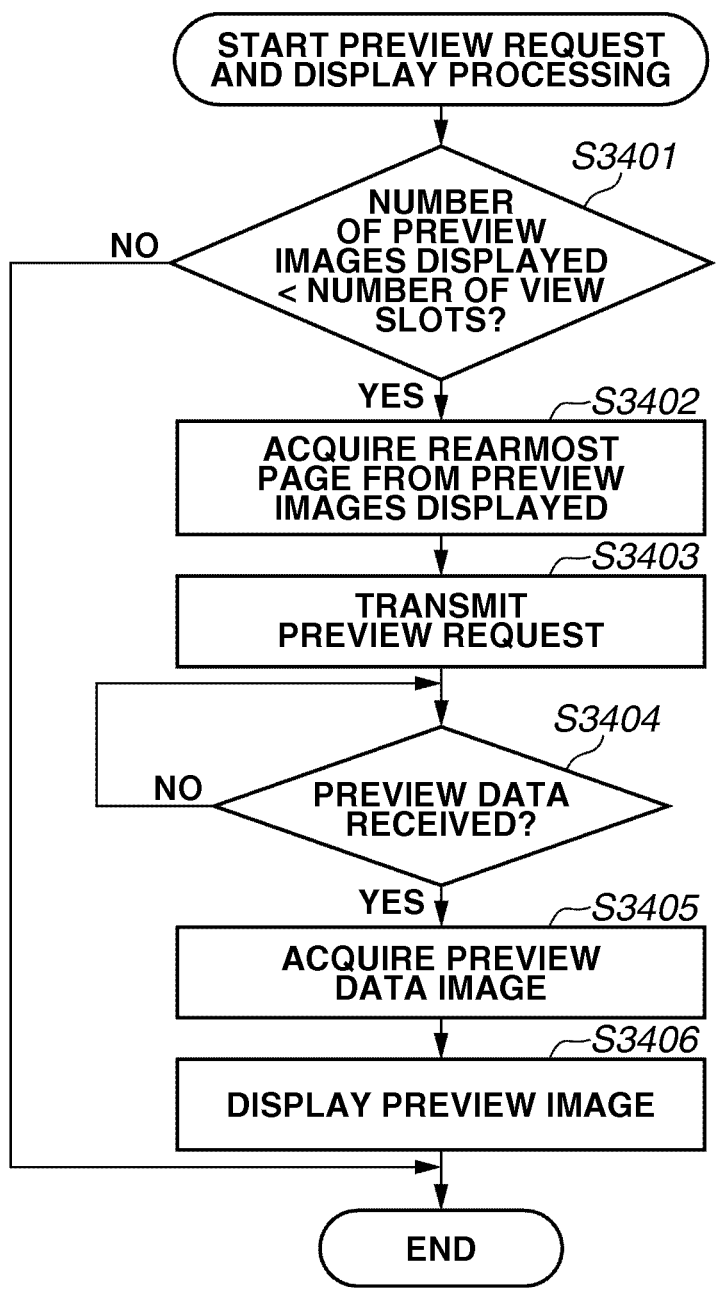

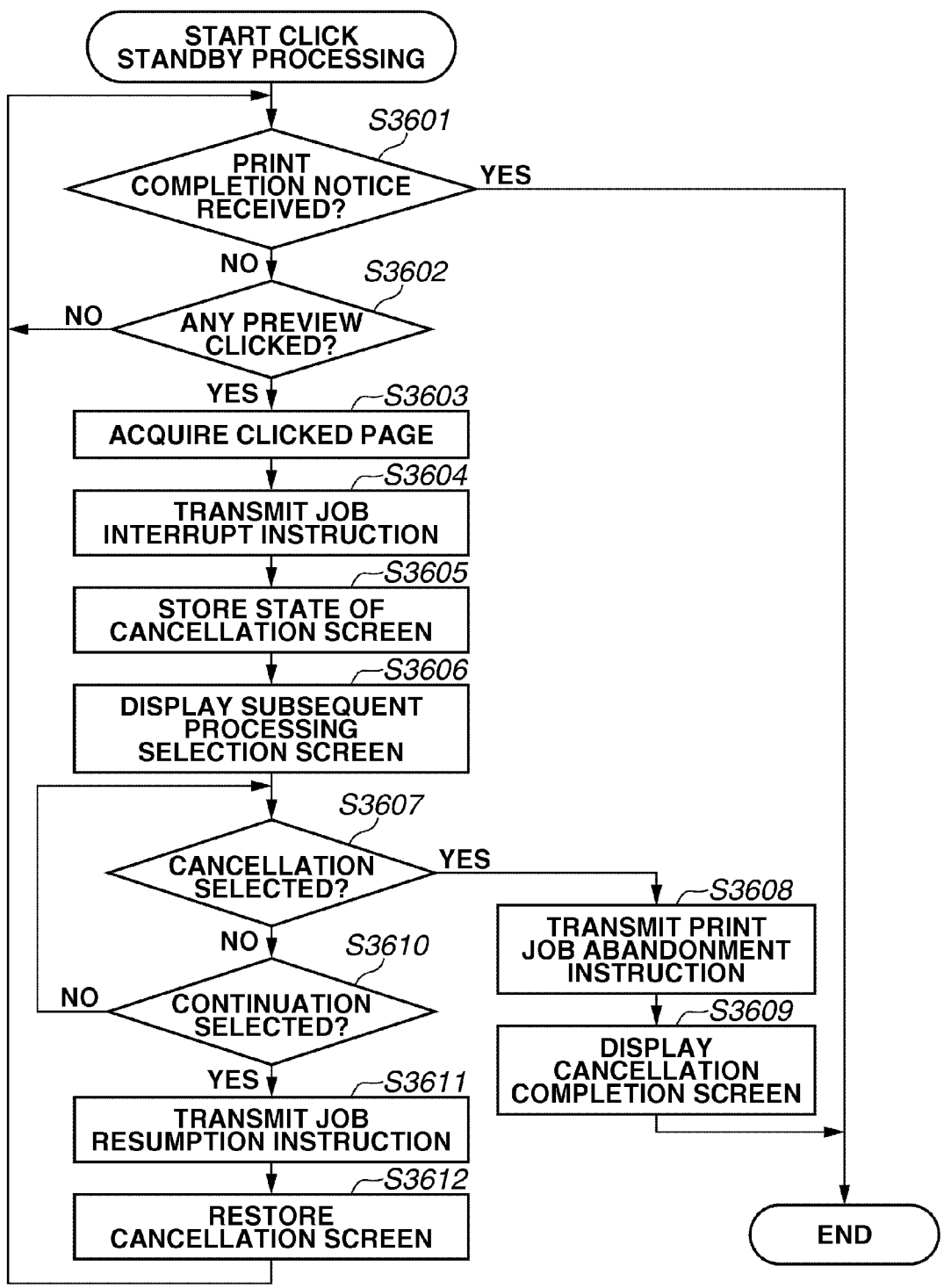

IMAGE FORMING APPARATUS, METHOD FOR CONTROLLING THE IMAGE FORMING APPARATUS, AND STORAGE MEDIUM

BACKGROUND OF THE INVENTION

1. Field of the Invention

The present invention relates to an image forming apparatus that can perform preview processing on a print image of a page to be printed, a method for controlling the image forming apparatus, and a storage medium.

2. Description of the Related Art

A recent image forming apparatus, such as a digital multifunction peripheral (hereinafter referred to as "multifunction peripheral"), has a print canceling function for enabling a user to interrupt print processing arbitrarily if the user cannot accept a printed product during a printing operation. The print canceling function is useful to prevent the print processing from being performed unnecessarily. The resources required in printing can be saved effectively and a period of time during which the multifunction peripheral is occupied by a single job can be reduced.

However, in many cases, the time when a user can determine acceptability of a printed product is later than the time the printed product is output actually. As a result, a significant amount of printed products will be output uselessly.

To solve the above-described problem, as discussed in Japanese Patent Application Laid-Open No. 2004-351872, it is conventionally feasible to discriminate a print completed portion of a print image from an unprinted portion on the image during a printing operation.

In general, the print processing to be performed by a multifunction peripheral includes a plurality of stages, such as paper feeding, transfer, fixing, and discharge. When a document to be printed includes a plurality of pages, the multifunction peripheral performs pipeline processing for simultaneously printing a plurality of pages instead of performing the processing thoroughly for each page.

For example, in a state where two pages are on the discharge stage and the transfer stage, respectively, a user may find an unnecessary print when the user is checking a preceding page. In this case, even if the printing operation is canceled immediately, a succeeding page (i.e., the page on the transfer stage) will be fixed and discharged sooner or later.

In this case, not only the preceding page (i.e., the cause of the print cancellation) but also the succeeding page (i.e., the page whose print processing was not stopped) are uselessly output as printed products. Further, according to the above-described conventional technique, the displayed images include all of the unprinted portions. In other words, the portions whose print processing is unstoppable are displayed unnecessarily.

SUMMARY OF THE INVENTION

The present invention is directed to a method for enabling users to confirm a print image whose print processing is cancellable and instruct cancellation or continuation of the print processing.

According to an aspect of the present invention, an image forming apparatus includes a generation unit configured to acquire print information from an input print job and to generate a preview image for displaying, on a display unit, a print image of a page to be printed whose print processing by a printing unit is still stoppable, and a preview control unit configured to display the preview image generated by the generation unit on the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating an example method for controlling the image forming apparatus according to the first exemplary embodiment.

FIG. 8 is a flowchart illustrating an example method for controlling the image forming apparatus according to the first exemplary embodiment.

FIG. 15 is a flowchart illustrating an example method for controlling the information processing apparatus according to the second exemplary embodiment.

FIG. 17 is a flowchart illustrating an example method for controlling the information processing apparatus according to the second exemplary embodiment.

FIG. 19 is a flowchart illustrating an example method for controlling the information processing apparatus according to the second exemplary embodiment.

DESCRIPTION OF THE EMBODIMENTS

Various exemplary embodiments, features, and aspects of the invention will be described in detail below with reference to the drawings.

Figure 1:
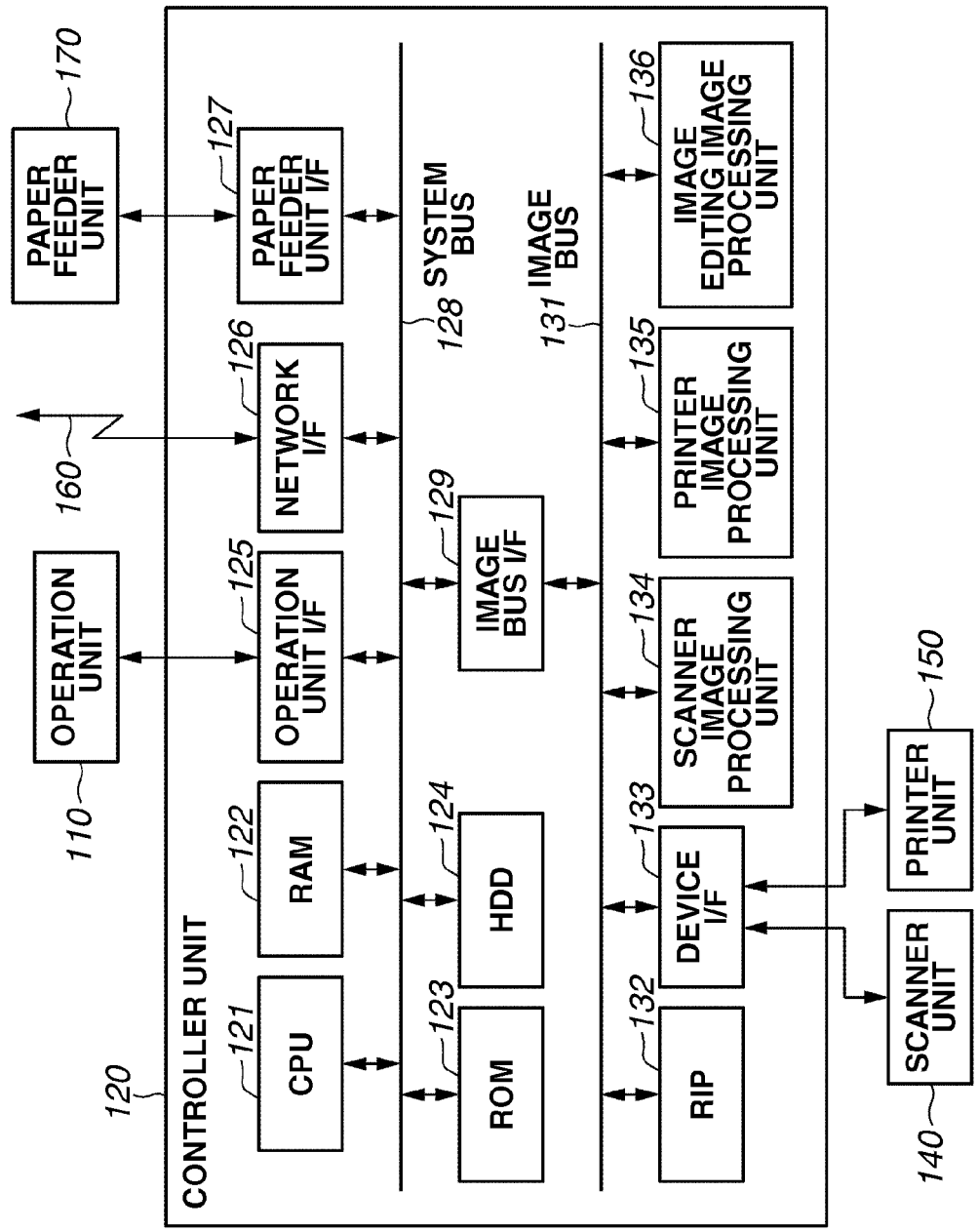
FIG. 1 is a block diagram illustrating an internal configuration of an image forming apparatus according to a first exemplary embodiment.

FIG. 1 is a block diagram illustrating an internal configuration of an image forming apparatus according to a first exemplary embodiment. The image forming apparatus according to the present exemplary embodiment is a multifunction peripheral. An exemplary embodiment is described below referring to a local operation unit of the multifunction peripheral.

The system illustrated in FIG. 1 includes an operation unit 110 and a controller unit 120 that are connected to each other. The operation unit 110 allows users to input/output search information and document information from/to a multifunction peripheral. The controller unit 120 is connected to a scanner unit 140, a printer unit 150, a network 160, and a paper feeder unit 170, to control each device and input/output various information (or data) from/to an external device.

The controller unit 120 includes a central processing unit (CPU) 121, a random access memory (RAM) 122, and a read only memory (ROM) 123. The CPU 121 can control various operations to be performed by the multifunction peripheral. The RAM 122 is functionally operable as a work memory that stores data temporarily when the CPU 121 performs calculations. The ROM 123 stores a boot program of the multifunction peripheral, which is used to activate the multifunction peripheral.

The controller unit 120 further includes a hard disk drive (HDD) 124, an operation unit I/F 125, a network I/F 126, and a paper feeder unit I/F 127. The hard disk drive (HDD) 124 stores software programs and various settings relating to the controls of the multifunction peripheral and document information having been saved. The operation unit I/F 125 is an interface capable of communicating with the operation unit 110 to input and output information (or data) from and to the operation unit 110. The network I/F 126 is an interface capable of inputting/outputting information (or data) from/to another multifunction peripheral or an information device via the network 160.

The paper feeder unit I/F 127 is an interface capable of communicating with the paper feeder unit 170 to transmit and receive information (or data) to and from the paper feeder unit 170. The above-described functional units 121 to 127 are mutually connected via a system bus 128.

The controller unit 120 further includes an image bus I/F 129 that is connected to the system bus 128 on one hand and connected to an image bus 131 on the other hand. The image bus I/F 129 is capable of converting the data structure between the system bus 128 and the image bus 131. The image bus 131 is connected to various blocks relating to image processing. More specifically, the image bus 131 is connected to a raster image processor (RIP) 132, a device I/F 133, a scanner image processing unit 134, a printer image processing unit 135, and an image editing image processing unit 136.

The RIP 132 can convert a page description language (PDL) code or a display list into a bitmap image. The device I/F unit 133 connects the scanner unit 140 and the printer unit 150 to the controller unit 120 to perform synchronous/asynchronous conversion of image data.

Further, the scanner image processing unit 134 can perform various (e.g., correction, modification, and editing) processing on image data acquired by the scanner unit 140. The printer image processing unit 135 can perform correction and resolution conversion processing on image data to be printed according to a printer engine. The image editing image processing unit 136 can perform various image processing (e.g., rotation processing and compression/decompression processing) on image data.

Figure 2:
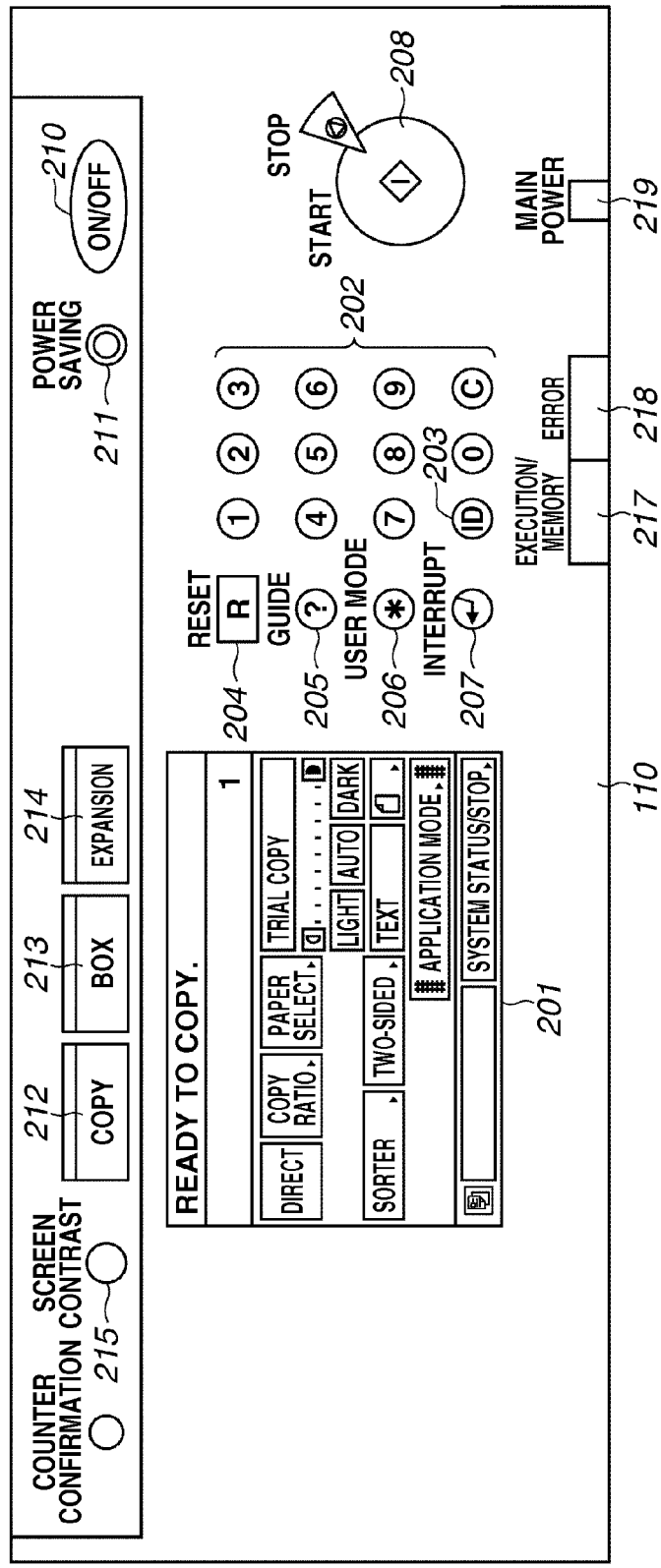
FIG. 2 is a plan view illustrating an example configuration of an operation unit illustrated in FIG. 1.

FIG. 2 is a plan view illustrating an example configuration of the operation unit 110 illustrated in FIG. 1. The operation unit 110 illustrated in FIG. 2 includes a touch panel 201, which is composed of a display unit (LCD) and a touch input unit to allow users to perform fundamental settings and status display. Further, the touch panel 201 has a soft keyboard function to allow users to input a character string. A numeric keypad 202 can be used to input numerical values 0 to 9. An ID key 203 is usable to input a section (or department) number and a password code when the apparatus is managed for each section (or department).

A reset key 204 can be used to reset a mode having been set. A guide key 205 can be used to display an explanation screen of each mode. A user mode key 206 can be used to display a user mode screen. An interrupt key 207 can be used to interrupt a copy operation. A start key 208 can be used to start a copy operation. A stop key 209 can be used to stop the copy job.

If a user presses a soft power key 210, the backlight of the touch panel 201 is turned off and the apparatus is brought into a power saved state. If a user presses a power saving key 211, the apparatus is brought into a power saving state. If the power saving key 211 is pressed again, the apparatus can restore from the power saving state.

A copy key 212, a box key 213, and an expansion key 214 are function keys operable to start copy, box, and expansion functions, respectively. FIG. 2 illustrates a copy standard screen displayed on the touch panel 201. If another function key (e.g., the box key 213 or the expansion key 214) is pressed, a corresponding standard screen can be displayed on the touch panel 201.

A screen contrast key 215 is an adjustment key that can be used to adjust the contrast of the touch panel 201. A counter confirmation key 216 can be used to confirm a count value representing the number of sheets of paper having been copied.

An execution/memory LED 217 is a light-emitting diode (LED) that indicates an execution state of a job or a storage state of an image into a memory. An error LED 218 is an LED that indicates an error state, such as a paper jam state or a door open state, of the apparatus. A main power LED 219 is an LED that indicates an ON state of the main switch of the apparatus.

Next, an example procedure of cancellation screen display processing according to the present exemplary embodiment is described below. To realize each step of flowcharts illustrated in FIG. 4, FIG. 5, FIG. 7, FIG. 8, FIG. 11, and FIG. 9, the CPU 121 of the multifunction peripheral executes a related program loaded from the HDD 124.

Figure 3:
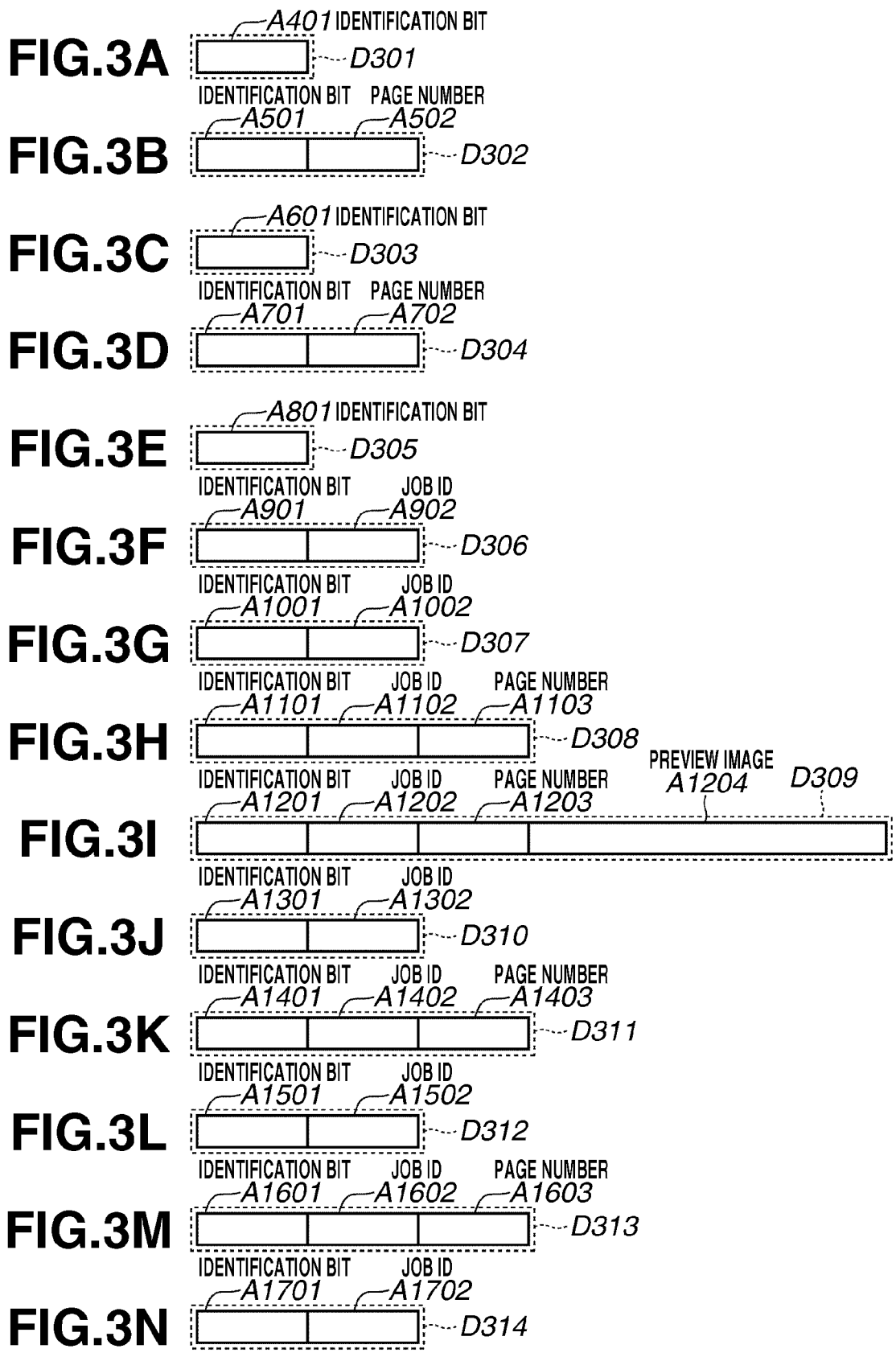
FIGS. 3A, 3B, 3C, 3D, and 3E illustrate example formats of information that can be processed by the image forming apparatus according to the first exemplary embodiment.
FIGS. 3F, 3G, 3H, 3I, 3J, 3K, 3L, 3M, and 3N illustrate example formats of information that can be processed by the image forming apparatus according to a second exemplary embodiment.

Hereinafter, example formats of information that can be transmitted or received between processing processes according to the present exemplary embodiment are described in detail below with reference to FIGS. 3A to 3E. The information formats illustrated in FIGS. 3A to 3E can be processed by the image forming apparatus according to the present exemplary embodiment. FIG. 3A illustrates an example format of a job interrupt instruction D301. The job interrupt instruction D301 is a packet including an identification bit area A401 that indicates a job interrupt instruction. The job interrupt instruction D301 can be transmitted from tap standby processing to preview processing and print processing in step S2304 as described below.

FIG. 3B illustrates an example format of a job abandonment instruction D302. The job abandonment instruction D302 is a packet including an identification bit area A501 that indicates a job abandonment instruction and an area A502 that stores a page number that represents a cancellation start point. The job abandonment instruction D302 can be transmitted from the tap standby processing to the preview processing and the print processing in step S2308 as described below.

FIG. 3C illustrates an example format of a job resumption instruction D303. The job resumption instruction D303 is a packet including an identification bit area A601 that indicates a job resumption instruction. The job resumption instruction D303 can be transmitted from the tap standby processing to the preview processing and the print processing in step S2311 as described below.

FIG. 3D illustrates an example format of a paper feeding notice D304. The paper feeding notice D304 is a packet including an identification bit area A701 that indicates a paper feeding notice and an area A702 that stores a page number to be printed on a paper to be fed next. The paper feeding notice D304 can be transmitted from the print processing to the preview processing in step S2504 as described below.

FIG. 3E illustrates an example format of a print completion notice D305. The print completion notice D305 is a packet including an identification bit area A801 that indicates a print completion notice. The print completion notice D305 can be transmitted from the print processing to the tap standby processing in step S2518 as described below.

Hereinafter, an example flow of the overall processing according to the present exemplary embodiment is described in detail below with reference to the flowchart illustrated in FIG. 4.

Figure 4:
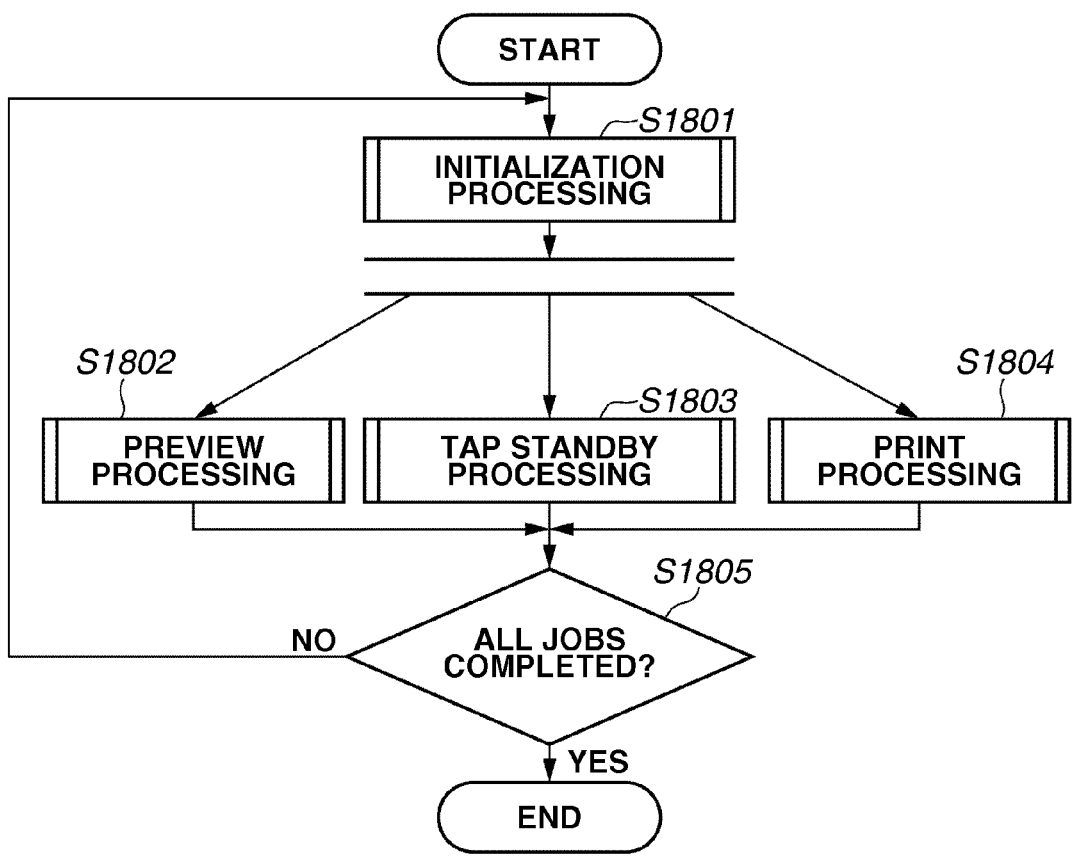
FIG. 4 is a flowchart illustrating an example method for controlling the image forming apparatus according to the first exemplary embodiment.

FIG. 4 is a flowchart illustrating an example method for controlling the image forming apparatus according to the present exemplary embodiment. The processing content illustrated in FIG. 4 is an example of the cancellation screen display processing. To realize each step of the flowchart illustrated in FIG. 4, the CPU 121 of the controller unit 120 of the multifunction peripheral executes a related program loaded from the HDD 124.

First, if a user instructs a printing operation, then in step S1801, the CPU 121 performs initialization processing having been set beforehand. If the initialization processing has been completed, then in step S1802, the CPU 121 executes preview processing for displaying a preview image of a print image on the operation unit 110. In step S1803, the CPU 121 waits until the user taps an intended preview image displayed on the operation unit 110. Further, in step S1804, the CPU 121 performs printing of an image tapped by the user.

In the present exemplary embodiment, the CPU 121 can independently perform the processing of step S1802, step S1803, and step S1804 in a parallel fashion. The processing to be performed in step S1801, step S1802, step S1803, and step S1804 is described in detail below.

If the processing in step S1802, step S1803, and step S1804 has been completed thoroughly, then in step S1805, the CPU 121 determines whether the processing has been completed for all jobs. If it is determined that the processing has been completed for all jobs (YES in step S1805), the CPU 121 terminates the cancellation screen display processing of the flowchart illustrated in FIG. 4. On the other hand, if the CPU 121 determines that the processing is not yet completed for all jobs (NO in step S1805), the processing returns to step S1801.

Figure 5:
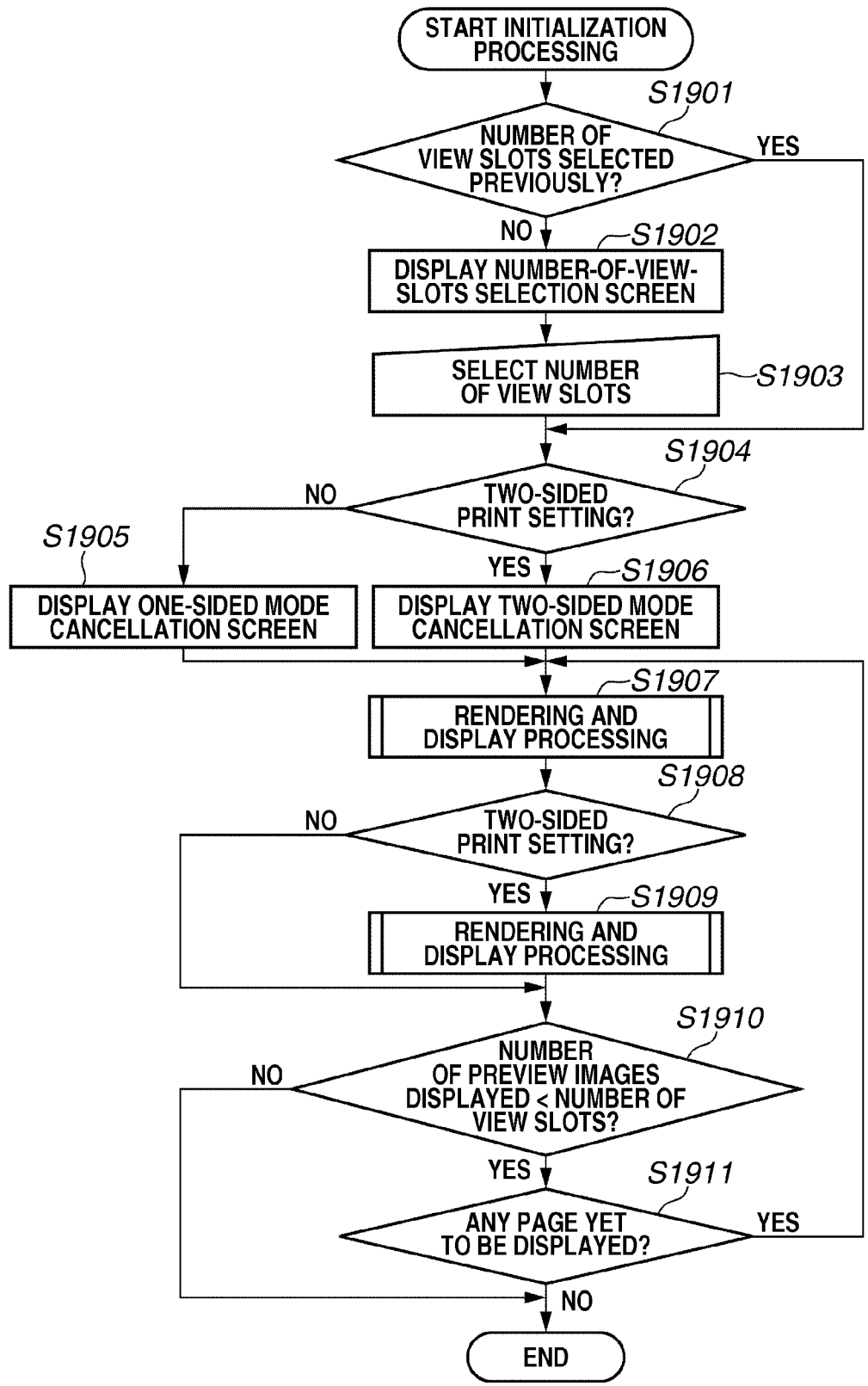
FIG. 5 is a flowchart illustrating an example method for controlling the image forming apparatus according to the first exemplary embodiment.

Hereinafter, an example flow of the initialization processing is described in detail below with reference to the flowchart illustrated in FIG. 5 and illustrations in FIGS. 6A to 6C. FIG. 5 is a flowchart illustrating an example method for controlling the image forming apparatus according to the present exemplary embodiment. The processing content illustrated in FIG. 5 is a detailed procedure of the initialization processing to be performed in step S1801. To realize each step of the flowchart illustrated in FIG. 5, the CPU 121 of the controller unit 120 of the multifunction peripheral executes a related program loaded from the HDD 124.

First, in step S1901, the CPU 121 determines whether the number of view slots has been selected previously by a user. If the number of view slots is already stored in the HDD 124, the CPU 121 determines that the number of view slots has been already selected by the user. The processing proceeds directly to step S1904 while skipping steps S1902 and S1903.

On the other hand, if the CPU 121 determines that the number of view slots is not yet stored in the HDD 124 (NO in step S1901), then in step S1902, the CPU 121 displays a number-of-view-slots selection screen on the touch panel 201 of the operation unit 110.

Figure 6A:
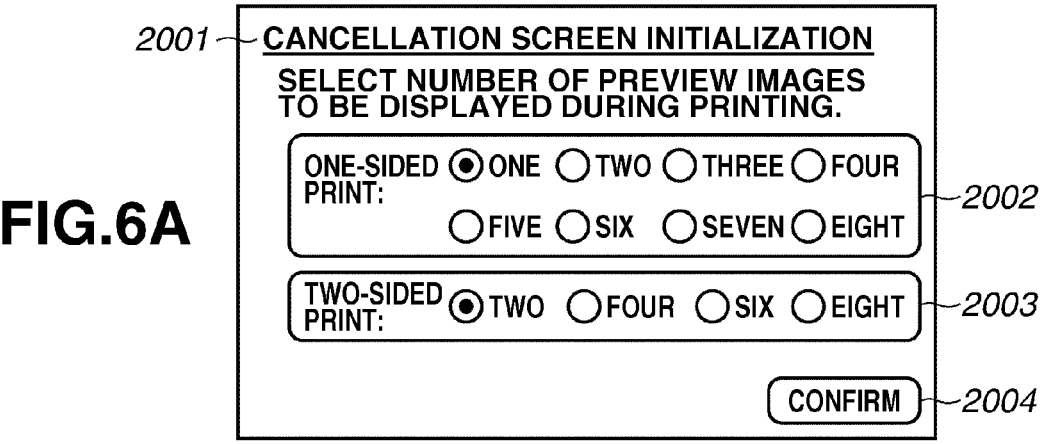
FIGS. 6A, 6B, and 6C illustrate examples of a user interface (UI) screen that can be displayed by the image forming apparatus according to the first exemplary embodiment.
Figure 6B:
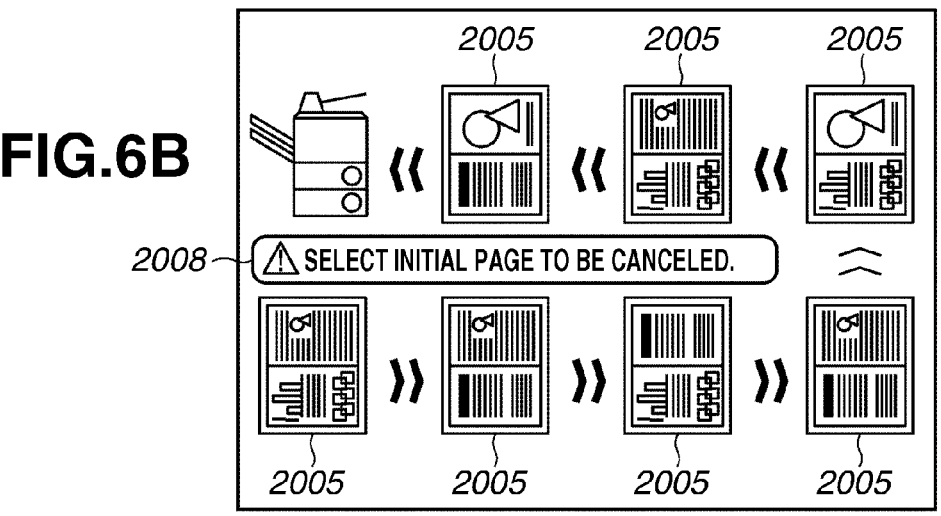
Figure 6C:
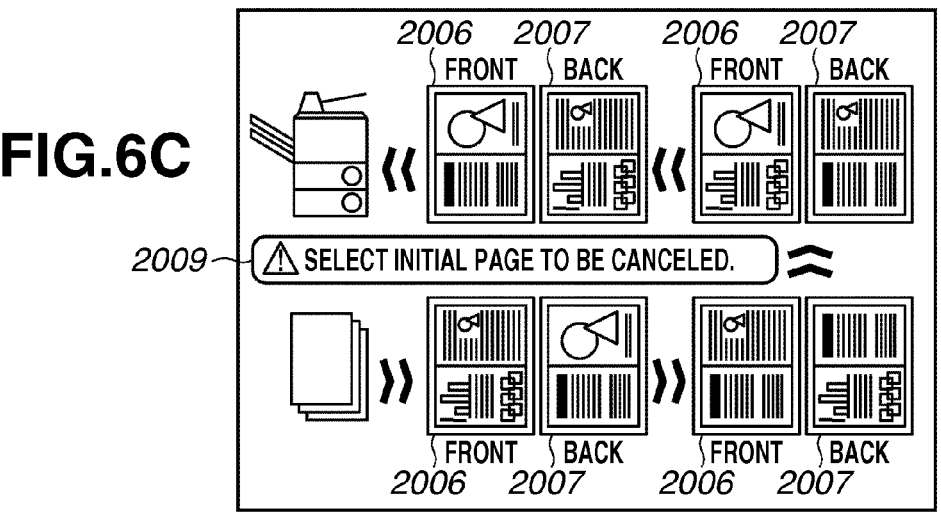

FIGS. 6A to 6C illustrate examples of the user interface (UI) screen that can be displayed on the touch panel 201 of the operation unit 110 illustrated in FIG. 1. FIG. 6A illustrates an example of the number-of-view-slots selection screen. In the example illustrated in FIGS. 6A to 6C, print images of a plurality of pages whose print processing is still stoppable are displayed on the touch panel 201 in such a way as to sequentially align the images from the head page.

The selection screen illustrated in FIG. 6A includes an area 2001 in which an explanation of the screen function (i.e., a text of function related content) is displayed, an area 2002 in which the number of view slots for the preview images to be displayed during one-sided printing is selectable, and an area 2003 in which the number of view slots for the preview images to be displayed during two-sided printing is selectable.

The user can select a desired number of preview images for each of one-sided printing and two-sided printing by tapping a desired number of preview images displayed in each of the area 2002 and the area 2003. A button 2004 allows the user to confirm the selected number of view slots for the preview images to be displayed. If the CPU 121 accepts the preview display number having been set by the user using the button illustrated in FIG. 6A, the CPU 121 determines the number of preview images to be displayed on the touch panel 201 according to the received preview display number.

If the button 2004 is pressed by the user, then in step S1903, the CPU 121 receives the number of view slots selected by the user and stores the preview display numbers for the one-sided printing and the two-sided printing in the HDD 124. Subsequently, in step S1904, the CPU 121 determines whether the print setting of the present print job is the two-sided printing.

If the CPU 121 determines that the print setting of the present print job is not the two-sided printing (NO in step S1904), then in step S1905, the CPU 121 displays a one-sided mode cancellation screen on the touch panel 201 of the operation unit 110. FIG. 6B illustrates an example of the one-sided mode cancellation screen.

According to the example illustrated in FIG. 6B, there are seven view slots and the explanation of the function screen is displayed in an area 2008. Each preview image 2005 represents a page whose print processing is cancellable at present. The multifunction peripheral performs print processing according to the order of sequentially aligned preview images, from the first preview image 2005 positioned nearest to a printer icon. The user can tap any preview image 2005 to cancel the printing of the tapped page and subsequent pages.

On the other hand, if the CPU 121 determines that the print setting of the present print job is the two-sided printing (YES in step S1904), then in step S1906, the CPU 121 displays a two-sided mode cancellation screen on the touch panel 201 of the operation unit 110. FIG. 6C illustrates an example of the two-sided mode cancellation screen. According to the example in FIG. 6C, there are eight view slots and the explanation of the function screen is displayed in an area 2009.

Each preview image 2006 represents a front page whose print processing is cancellable at present. Each preview image 2007 represents a back page whose print processing is cancellable at present. Each combination of the preview image 2006 and the preview image 2007 represents the front and back pages to be printed on the same sheet of paper. The order of the preview image 2006 and the preview image 2007 disposed on the screen represents the order of printing. The user can tap any preview image 2006 or 2007 to cancel the printing of the tapped page and subsequent pages.

If the cancellation screen display processing is completed, then in step S1907, the CPU 121 performs rendering and display processing. The processing to be performed in step S1907 is described in detail below. Subsequently, in step S1908, the CPU 121 determines whether the print setting having been set for the present print job is the two-sided printing. If the CPU 121 determines that the print setting is not the two-sided printing (NO in step S1908), the processing proceeds directly to step S1910 while skipping step S1909.

On the other hand, if the CPU 121 determines that the print setting having been set for the present print job is the two-sided printing (YES in step S1908), then in step S1909, the CPU 121 performs rendering and display processing for the back page. The content of the processing in step S1909 is similar to that of the above-described processing in step S1907.

Subsequently, in step S1910, the CPU 121 determines whether the number of preview images presently displayed on the touch panel 201 is less than the number of view slots. If the CPU 121 determines that the number of the presently displayed preview images is not less than the number of view slots (NO in step S1910), the CPU 121 terminates the processing of the flowchart illustrated in FIG. 5. On the other hand, if the CPU 121 determines that the number of the presently displayed preview images is less than the number of view slots (YES in step S1910), namely if it is determined that an additional preview image can be displayed on the cancellation screen, the processing proceeds to step S1911.

Then, in step S1911, the CPU 121 determines whether a page whose preview image is yet to be displayed is present in the document to be printed. If the CPU 121 determines that there is at least one page that is yet to be subjected to the preview display processing (YES in step S1911), the processing returns to step S1907. On the other hand, if the CPU 121 determines that there is not any page that is yet to be subjected to the preview display processing (NO in step S1911), namely, if it is determined that the preview display has been completed for all pages, the CPU 121 terminates the processing of the flowchart illustrated in FIG. 5.

Hereinafter, an example flow of the rendering and display processing is described in detail below with reference to the flowchart illustrated in FIG. 7. FIG. 7 is a flowchart illustrating an example method for controlling the image forming apparatus according to the present exemplary embodiment. The processing content illustrated in FIG. 7 is a detailed procedure of the rendering and display processing to be performed in step S1907 and step S1909. To realize each step of the flowchart illustrated in FIG. 7, the CPU 121 of the controller unit 120 of the multifunction peripheral executes a related program loaded from the HDD 124.

First, in step S2101, the CPU 121 determines whether the number of preview images displayed presently on the cancellation screen of the touch panel 201 is less than the number of view slots. If the CPU 121 determines that the number of the presently displayed preview images is equal to or greater than the number of view slots (NO in step S2101), namely if it is determined that no more preview image can be displayed on the cancellation screen, the CPU 121 terminates the processing of the flowchart illustrated in FIG. 7.

On the other hand, if the CPU 121 determines that the number of the presently displayed preview images is less than the number of view slots (YES in step S2101), namely if it is determined that an additional preview image can be displayed on the cancellation screen, the processing proceeds to step S2102. Then, in step S2102, the CPU 121 acquires the rearmost page from the preview images displayed presently on the cancellation screen. Then, in step S2103, the CPU 121 sends the next page following the rearmost page to the image editing image processing unit 136, the printer image processing unit 135, and the RIP 132, via the system bus 128, the image bus I/F 129, and the image bus 131, to generate a bitmap image. The generated bitmap image is temporarily stored in the RAM 122.

Subsequently, in step S2104, the CPU 121 makes a copy of the bitmap image generated in step S2103 and stores the obtained copy in the HDD 124 in association with the page number. Then, in step S2105, the CPU 121 performs thinning reduction processing on the bitmap image stored in the RAM 122 in such a way as to adjust the size of the bitmap image according to the view slot of the cancellation screen. Then, the CPU 121 stores the reduced bitmap image, as a preview image, in the HDD 124. Then, the CPU 121 deletes the bitmap image from the RAM 122 because the temporarily stored image is no longer used in the subsequent processing.

Then, in step S2106, the CPU 121 displays the preview image (i.e., the image generated in step S2105) in a leading available slot of the cancellation screen displayed on the touch panel 201 of the operation unit 110. Then, the CPU 121 terminates the processing of the flowchart illustrated in FIG. 7.

Hereinafter, an example flow of the preview processing is described in detail below with reference to a flowchart illustrated in FIG. 8. FIG. 8 is a flowchart illustrating an example method for controlling the image forming apparatus according to the present exemplary embodiment. The processing content illustrated in FIG. 8 is a detailed procedure of the preview processing to be performed in step S1802. To realize each step of the flowchart illustrated in FIG. 8, the CPU 121 of the controller unit 120 of the multifunction peripheral executes a related program loaded from the HDD 124.

Hereinafter, an example preview generation processing is described below. In the preview generation processing, the CPU 121 acquires print information from an input print job and, if print processing is still stoppable at present, displays a print image of a page to be printed by the printer unit 150 on a display unit.

Figure 9:
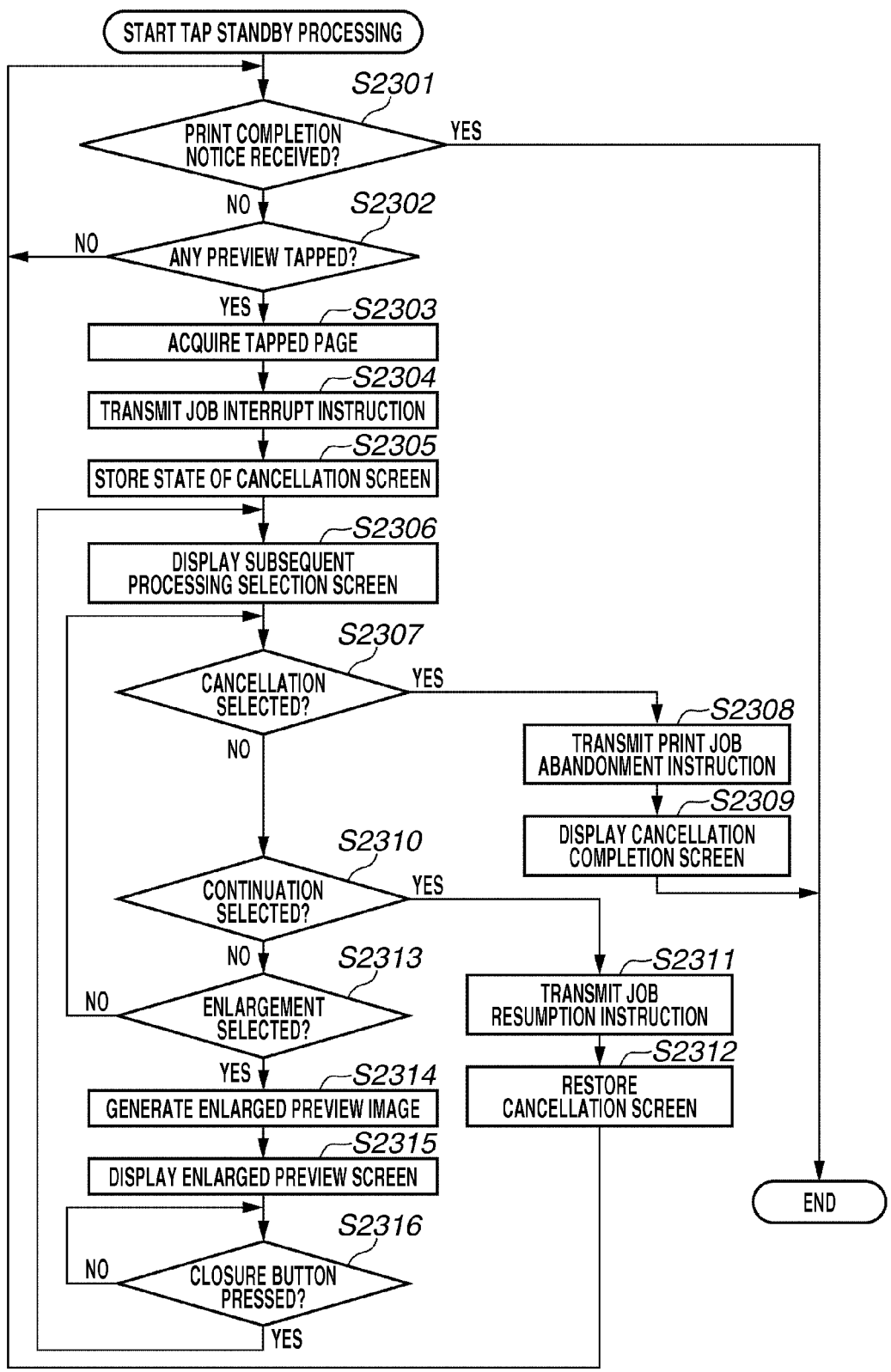
FIG. 9 is a flowchart illustrating an example method for controlling the image forming apparatus according to the first exemplary embodiment.

First, in step S2201, the CPU 121 determines whether the job interrupt instruction D301 (i.e., an instruction to be transmitted in step S2304 illustrated in FIG. 9) has been received. If the CPU 121 determines that the job interrupt instruction D301 is not yet received (NO in step S2201), the processing proceeds directly to step S2204 while skipping steps S2202 and S2203.

On the other hand, if the CPU 121 determines that the job interrupt instruction D301 has been received (YES in step S2201), then in step S2202, the CPU 121 determines whether the job abandonment instruction D302 (i.e., an instruction to be transmitted in step S2308 illustrated in FIG. 9) has been received. If it is determined that the job abandonment instruction D302 has been received (YES in step S2202), the CPU 121 terminates the preview processing of the flowchart illustrated in FIG. 8.

On the other hand, if the CPU 121 determines that the job abandonment instruction D302 is not yet received (NO in step S2202), then in step S2203, the CPU 121 determines whether the job resumption instruction D303 (i.e., an instruction to be transmitted in step S2311) has been received. If the CPU 121 determines that the job resumption instruction D303 is not yet received (NO in step S2203), the processing returns to step S2202. If the CPU 121 determines that the job resumption instruction D303 has been received (YES in step S2203), the processing proceeds to step S2204.

Then, in step S2204, the CPU 121 determines whether the paper feeding notice D304 (i.e., a notice to be transmitted in step S2505) has been received. If the CPU 121 determines that the paper feeding notice D304 is not yet received (NO in step S2204), the processing returns to step S2201. For example, in step S2204, the CPU 121 can check a paper corresponding to the page to be displayed is already fed to determine whether the page to be displayed on the touch panel 201 is the page whose print processing is still stoppable.

On the other hand, if the CPU 121 determines that the paper feeding notice D304 has been received (YES in step S2204), then in step S2205, the CPU 121 reads a page to be printed on the paper having been fed (hereinafter, referred to as "fed page") from the area A702 of the paper feeding notice D304. It is now assumed that, in the case of two-sided printing, only the page to be printed on the front side is stored as a fed page in the area A702.

Then, in step S2206, the CPU 121 deletes the preview image of the fed page from the cancellation screen displayed on the touch panel 201 of the operation unit 110. More specifically, in step S2206, the CPU 121 executes preview control for updating the display status of a print image of a page whose print processing is still stoppable with reference to the progress of the print processing performed by the printer unit 150.

Subsequently, in step S2207, the CPU 121 determines whether the print setting of the present print job is the two-sided printing. If the CPU 121 determines that the print setting is not the two-sided printing (NO in step S2207), the processing proceeds directly to step S2209 while skipping step S2208.

On the other hand, if the CPU 121 determines that the print setting is the two-sided printing (YES in step S2207), then in step S2208, the CPU 121 deletes the preview image of the back page of the fed page from the cancellation screen displayed on the touch panel 201 of the operation unit 110.

Subsequently, in step S2209, the CPU 121 determines whether the preview image is still present on the cancellation screen displayed on the touch panel 201 of the operation unit 110. If the CPU 121 determines that the preview image is not present, more specifically if the preview images of all pages are deleted (NO in step S2209), the CPU 121 terminates the preview processing of the flowchart illustrated in FIG. 8. On the other hand, if the CPU 121 determines that the preview images are still present (YES in step S2209), then in step S2210, the CPU 121 rearranges the presently displayed preview images in such a way as to eliminate any available slot when caused due to deletion of a preview image.

Then, in step S2211, the CPU 121 determines whether a page whose preview image is yet to be displayed is present on the cancellation screen although it is included in a print range. If the CPU 121 determines that a non-displayed page is not present (NO in step S2211), more specifically if it is unnecessary to generate a new preview image, the processing returns to step S2201.

On the other hand, if the CPU 121 determines that a page whose preview image is yet to be displayed is present in the cancellation screen (YES in step S2211), then in step S2212, the CPU 121 performs rendering and display processing. The content of the processing to be performed in step S2212 is similar to that of the above-described rendering and display processing.

Subsequently, in step S2213, the CPU 121 determines whether the print setting of the present print job is the two-sided printing. If the CPU 121 determines that the print setting is not the two-sided printing (NO in step S2213), the processing returns to step S2201. On the other hand, if the CPU 121 determines that the print setting is the two-sided printing (YES in step S2213), then in step S2214, the CPU 121 performs rendering and display processing for the back page. Then, the processing returns to step S2201. The content of the processing to be performed in step S2214 is similar to that of the processing described in step S2212.

Hereinafter, an example flow of the tap standby processing is described in detail below with reference to the flowchart illustrated in FIG. 9 and illustrations in FIGS. 10A to 10C. FIG. 9 is a flowchart illustrating an example method for controlling the image forming apparatus according to the present exemplary embodiment. The processing content illustrated in FIG. 9 is a detailed procedure of the tap standby processing to be performed in step S1803 illustrated in FIG. 4. To realize each step of the flowchart illustrated in FIG. 9, the CPU 121 of the controller unit 120 of the multifunction peripheral executes a related program loaded from the HDD 124.

Hereinafter, example processing that can be performed by the CPU 121 to accept an instruction from a user when the user selects any one of the print images of the pages displayed on the touch panel 201 is described below. Further, example processing that can be performed by the CPU 121 to control continuation or cancellation of the print processing applied to succeeding pages including a page displayed on the touch panel 201, according to the instruction received from the user, is described in detail below.

First, in step S2301, the CPU 121 determines whether the print completion notice D305 (i.e., the notice to be transmitted in step S2518) has been received. If the CPU 121 determines that the print completion notice D305 has been received (YES in step S2301), the CPU 121 terminates the tap standby processing of the flowchart illustrated in FIG. 9.

On the other hand, if the CPU 121 determines that the print completion notice D305 is not yet received (NO in step S2301), then in step S2302, the CPU 121 determines whether any preview image is tapped on the cancellation screen displayed on the touch panel 201 of the operation unit 110. If the CPU 121 determines that there is not any preview image tapped (NO in step S2302), the processing returns to step S2301.

On the other hand, if the CPU 121 determines that a preview image is tapped by a user (YES in step S2302), then in step S2303, the CPU 121 acquires the tapped page. Then, in step S2304, the CPU 121 performs transmission of the job interrupt instruction D301 addressed to the preview processing and the print processing. Subsequently, in step S2305, the CPU 121 stores the present status of the cancellation screen in the HDD 124. Then, in step S2306, the CPU 121 displays a subsequent processing selection screen on the touch panel 201 of the operation unit 110.

Figure 10A:
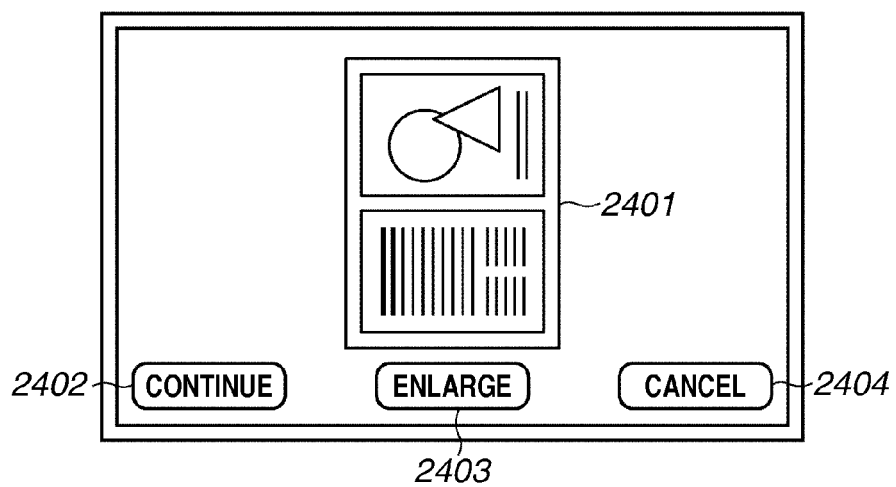
FIGS. 10A, 10B, and 10C illustrate examples of the UI screen that can be displayed by the image forming apparatus according to the first exemplary embodiment.
Figure 10B:
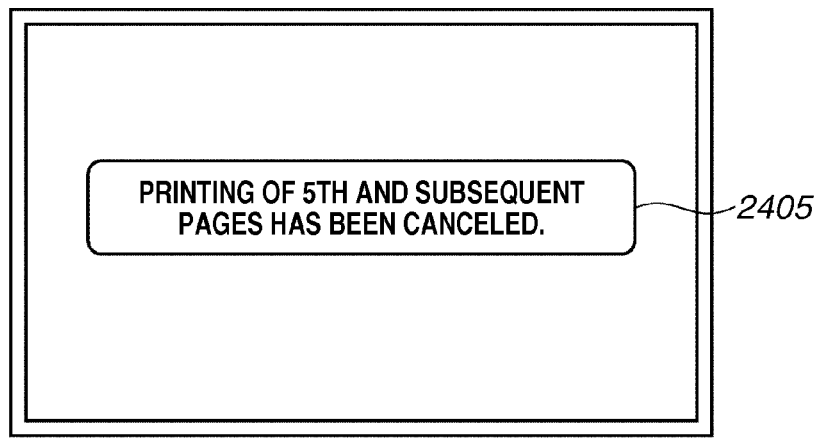
Figure 10C:
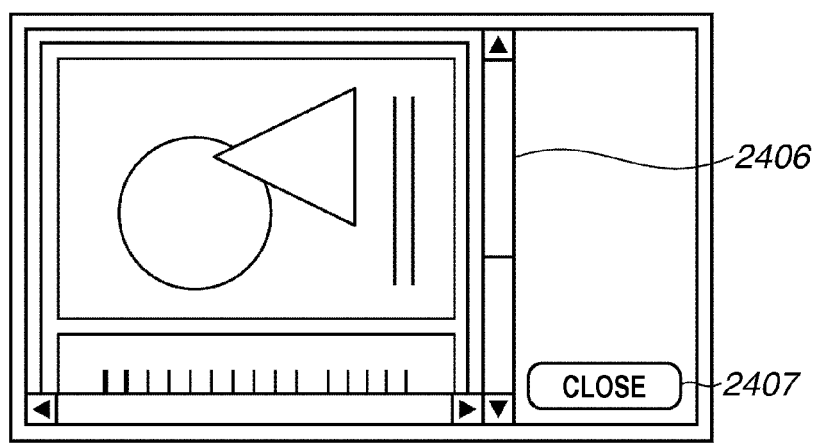

FIGS. 10A to 10C illustrate examples of the subsequent processing selection screen. In FIG. 10A, the tapped preview image is displayed in an area 2401. A continuation button 2402 can be pressed to release the present job from the interruption and continue the processing of the present job. An enlargement button 2403 can be pressed to call an enlarged preview screen. A cancellation button 2404 can be pressed to cancel the present job.

Then, in step S2307, the CPU 121 determines whether the cancellation button 2404 has been pressed by the user. If the CPU 121 determines that the cancellation button 2404 has been pressed (YES in step S2307), then in step S2308, the CPU 121 generates the job abandonment instruction D302 including the tapped page number acquired in step S2303 in the area A502 and performs transmission of the job abandonment instruction D302 addressed to the preview processing and the print processing.

Then, in step S2309, the CPU 121 displays a cancellation completion screen on the touch panel 201 of the operation unit 110 and terminates the tap standby processing of the flowchart illustrated in FIG. 9. FIG. 10B illustrates an example of the cancellation completion screen. The screen illustrated in FIG. 10B includes an area 2405 in which a message that informs cancellation of the present job is displayed together with the page number that represents the cancellation start point. More specifically, according to the cancellation completion screen illustrated in FIG. 10B, the tapped page is the fifth page and it is understood that the printing of the fifth and subsequent pages has been canceled.

On the other hand, if the CPU 121 determines that the cancellation button 2404 has not been pressed (NO in step S2307), then in step S2310, the CPU 121 determines whether the continuation button 2402 has been pressed by the user. If the CPU 121 determines that the continuation button 2402 has been pressed (YES in step S2310), then in step S2311, the CPU 121 performs transmission of the job resumption instruction D303 addressed to the preview processing and the print processing. Then, in step S2312, the CPU 121 deletes the subsequent processing selection screen displayed on the touch panel 201, and displays the cancellation screen in such a way as to restore the cancellation screen state stored in step S2305 on the touch panel 201 of the operation unit 110. Then, the processing returns to step S2301.

On the other hand, if the CPU 121 determines that the continuation button 2402 has not been pressed (NO in step S2310), then in step S2313, the CPU 121 determines whether the enlargement button 2403 has been pressed by the user. If the CPU 121 determines that the enlargement button 2403 has not been pressed (NO in step S2313), the processing returns to step S2307. On the other hand, if the CPU 121 determines that the enlargement button 2403 has been pressed (YES in step S2313), then in step S2314, the CPU 121 generates an enlarged preview image (i.e., an image larger than the preview image displayed on the cancellation screen) by making a copy of the bitmap image of the tapped page stored in the HDD 124 in step S2104 and rasterizing it on the RAM 122.

Subsequently, in step S2315, the CPU 121 displays an enlarged preview screen on the touch panel 201. FIG. 10C illustrates an example of the enlarged preview screen. The enlarged preview screen illustrated in FIG. 10C includes an area 2406 where the enlarged preview image (i.e., the image generated in step S2314) can be displayed and a closure button 2407 that can be used to close the enlarged preview screen.

Subsequently, in step S2316, the CPU 121 of the controller unit 120 determines whether the closure button 2407 has been pressed. If the CPU 121 confirms that the closure button 2407 has been pressed (YES in step S2316), the processing returns to step S2306.

Figure 11:
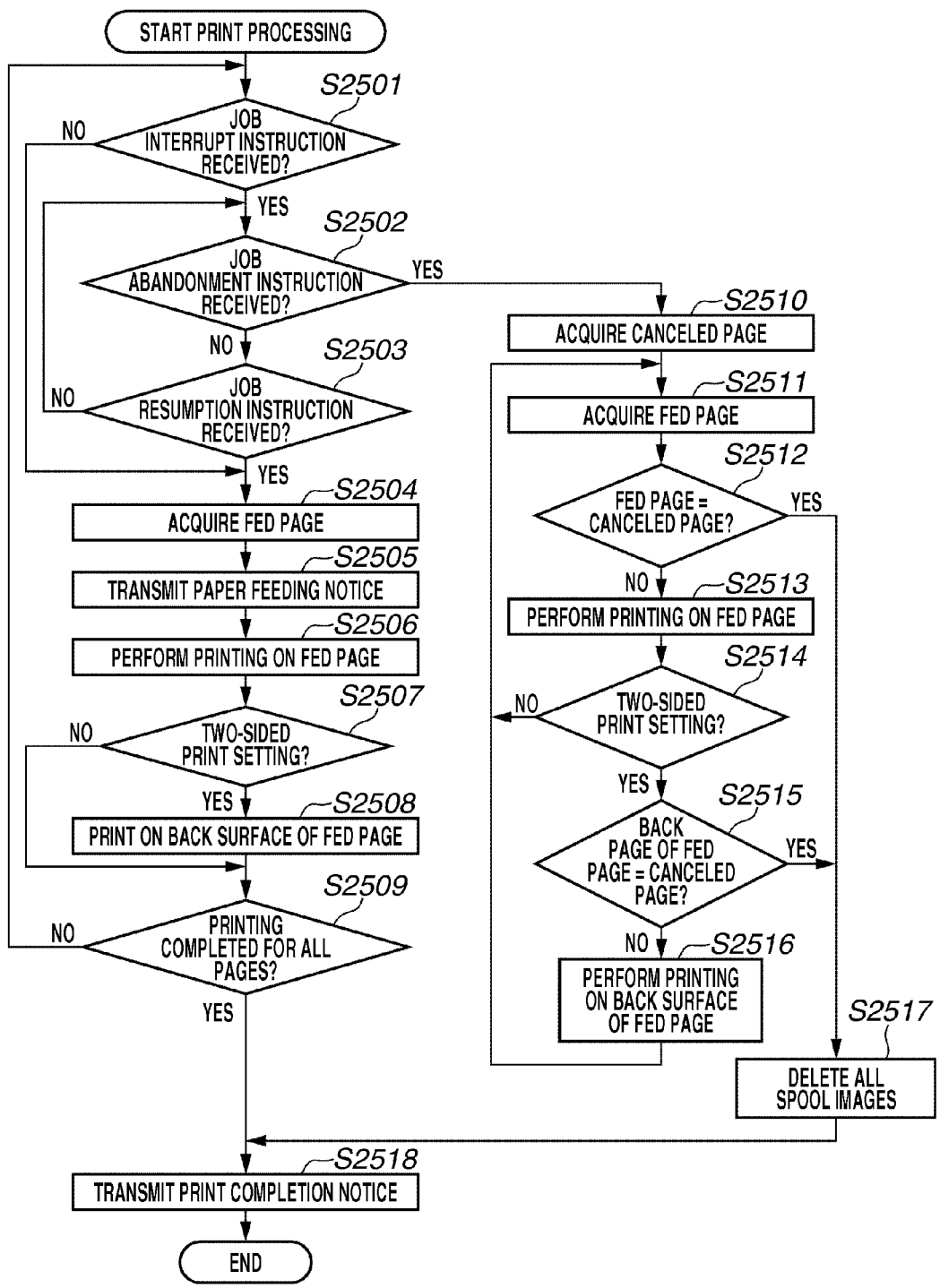
FIG. 11 is a flowchart illustrating an example method for controlling the image forming apparatus according to the first exemplary embodiment.

Hereinafter, an example flow of the print processing is described in detail below with reference to a flowchart illustrated in FIG. 11. FIG. 11 is a flowchart illustrating an example method for controlling the image forming apparatus according to the present exemplary embodiment. The processing content illustrated in FIG. 11 is a detailed procedure of the print processing to be performed in step S1804 illustrated in FIG. 4. To realize each step of the flowchart illustrated in FIG. 11, the CPU 121 of the controller unit 120 of the multifunction peripheral executes a related program loaded from the HDD 124.

First, in step S2501, the CPU 121 determines whether the job interrupt instruction D301 (i.e., the instruction transmitted in step S2304) has been received. If the CPU 121 determines that the job interrupt instruction D301 is not yet received (NO in step S2501), the processing proceeds directly to step S2504 while skipping steps S2502 and S2503.

On the other hand, if the CPU 121 determines that the job interrupt instruction D301 has been received (YES in step S2501), then in step S2502, the CPU 121 determines whether the job abandonment instruction D302 (i.e., the instruction transmitted in step S2308) has been received. If the CPU 121 determines that the job abandonment instruction D302 has been received (YES in step S2502), the processing proceeds to step S2510.

On the other hand, if the CPU 121 determines that the job abandonment instruction D302 is not yet received (NO in step S2502), then in step S2503, the CPU 121 determines whether the job resumption instruction D303 (i.e., the instruction transmitted in step S2311) has been received. If the CPU 121 determines that the job resumption instruction D303 is not yet received (NO in step S2503), the processing returns to step S2502. On the other hand, if the CPU 121 determines that the job resumption instruction D303 has been received (YES in step S2503), the processing proceeds to step S2504.

Then, in step S2504, the CPU 121 acquires a page to be printed on the paper having been fed next (hereinafter, referred to as "fed page"). It is now assumed that, in the case of two-sided printing, the page to be printed on the front side is referred to as the fed page. Subsequently, in step S2505, the CPU 121 performs transmission of the paper feeding notice D304 addressed to the preview processing. The paper feeding notice D304 transmitted in this case includes the fed page stored in the area A702 illustrated in FIG. 3D.

Then, in step S2506, the CPU 121 transmits a paper feeding start command to the paper feeder unit 170 via the paper feeder I/F 127. Further, the CPU 121 transmits the bitmap image of the fed page stored in the HDD 124 in step S2104 to the printer unit 150 via the device I/F 133 to perform print processing. In this case, the CPU 121 deletes the bitmap image from the HDD 124 because the fed page stored in the HDD 124 is no longer used in the subsequent processing.

Subsequently, in step S2507, the CPU 121 determines whether the print setting of the present print job is the two-sided printing. If the CPU 121 determines that the print setting is not the two-sided printing (NO in step S2507), the processing proceeds directly to step S2509 while skipping step S2508. On the other hand, if the CPU 121 determines that the print setting is the two-sided printing (YES in step S2507), then in step S2508, the CPU 121 performs printing on the back surface of the fed page (namely, performs processing similar to that described in step S2506).

Then, in step S2509, the CPU 121 determines whether the print processing has been completed for all pages. If the CPU 121 determines that the print processing is not yet completed (NO in step S2509), the processing returns to step S2501. On the other hand, if the CPU 121 determines that the print processing has been completed for all pages (YES in step S2509), the processing proceeds to step S2518.

On the other hand, if the CPU 121 determines that the job abandonment instruction D302 has been received (YES in step S2502), then in step S2510, the CPU 121 reads a page tapped as a cancellation start point (hereinafter, referred to as "canceled page") from the area A502 of the job abandonment instruction D302. Subsequently, in step S2511, the CPU 121 acquires the fed page in the same manner as the processing in step S2504. Then, in step S2512, the CPU 121 determines whether the fed page is the canceled page. If the CPU 121 determines that the fed page is the canceled page (YES in step S2512), the processing proceeds to step S2517.

On the other hand, if the CPU 121 determines that the fed page is not the canceled page (NO in step S2512), then in step S2513, the CPU 121 performs printing on the fed page according to a procedure similar to that described in step S2506. Subsequently, in step S2514, the CPU 121 determines whether the print setting of the present print job is the two-sided printing. If the CPU 121 determines that the print setting is not the two-sided printing (NO in step S2514), the processing returns to step S2511.

On the other hand, if the CPU 121 determines that the print setting is the two-sided printing (YES in step S2514), then in step S2515, the CPU 121 determines whether the back page of the fed page is the canceled page. If the CPU 121 determines that the back page is the canceled page (YES in step S2515), the processing proceeds to step S2517. On the other hand, if the CPU 121 determines that the fed page is not the canceled page (NO in step S2515), then in step S2516, the CPU 121 performs printing on the back surface of the fed page according to a procedure similar to that described in step S2508.

On the other hand, if the CPU 121 determines that the fed page is the canceled page (YES in step S2512 or in step S2515), then in step S2517, the CPU 121 deletes all the bitmap images from the HDD 124 (i.e., deletes the images stored in step S2104). Then, in step S2518, the CPU 121 performs transmission of the print completion notice D305 addressed to the tap standby processing and terminates the print processing of the flowchart illustrated in FIG. 11.

As described above, the system according to the present exemplary embodiment can identify an unnecessary print before confirming a printed product actually output in a printing operation (e.g., copy) using a local operation unit. Further, the system according to the present exemplary embodiment can surely cancel the unnecessary print. Moreover, preview images corresponding to view slots can be displayed on the cancellation screen before starting a printing operation, from the head of a document to be printed. Therefore, users can cancel a print before starting a printing operation.

Next, a system according to a second exemplary embodiment, which can display a cancellation screen on an information processing apparatus (i.e., a host) accessible via a network and allows a user of the host to cancel a print job, is described in detail below.

Figure 12:
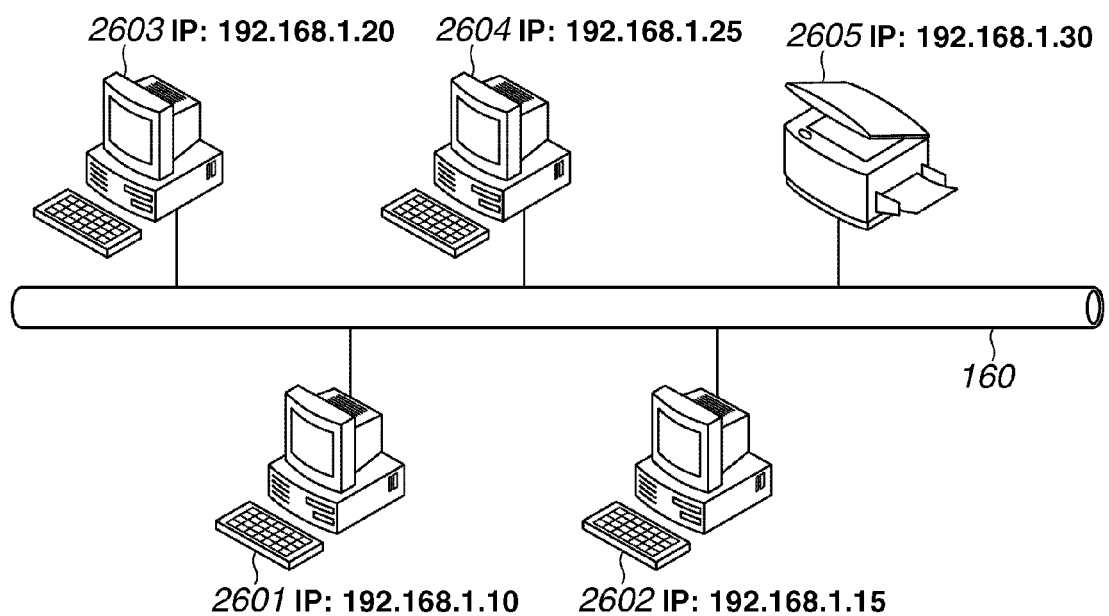
FIG. 12 illustrates an example configuration of an image forming system according to the second exemplary embodiment.

FIG. 12 illustrates an example configuration of an image forming system according to the second exemplary embodiment. The image forming system illustrated in FIG. 12 includes a plurality of personal computers (PCs) 2601, 2602, 2603, and 2604 and a multifunction peripheral 2605, which are mutually connected via the network 160. The multifunction peripheral 2605 has an internal configuration similar to that illustrated in FIG. 1. Further, an IP address is allocated to each PC and the multifunction peripheral so that each device can be identified via the network.

Appropriate browsing software is installed on the PC 2601 to display a UI screen that allows users to operate the multifunction peripheral 2605. Screen information, if obtained from the multifunction peripheral 2605, can be displayed on the UI screen to allow users to transmit an instruction to the multifunction peripheral 2605 while viewing the screen information. Each of the remaining PCs 2602, 2603, and 2604 has a similar configuration.

Figure 13:
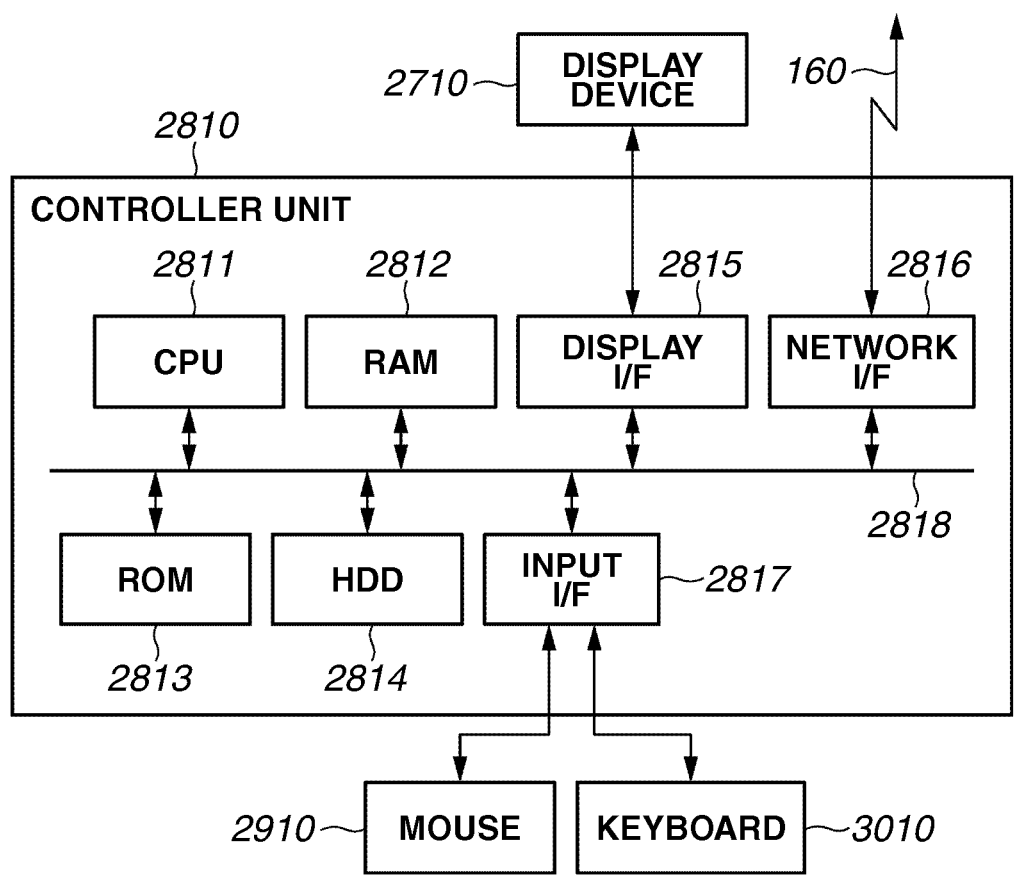
FIG. 13 is a block diagram illustrating an example configuration of an information processing apparatus illustrated in FIG. 2.

FIG. 13 illustrates an internal configuration of the PC 2601 illustrated in FIG. 12. The internal configuration of the remaining PCs 2602, 2603, and 2604 is similar to that of the PC 2601. The PC 2601 illustrated in FIG. 13 includes a display device 2710 connected to a controller unit 2810 to output information to users.

The controller unit 2810 is connected to a mouse 2910 and a keyboard 3010 in addition to the display device 2710 to allow users to control each device. The controller unit 2810 is connected to the network 160 to input and output various information from and to an external device.

The controller unit 2810 includes a central processing unit (CPU) 2811, a RAM 2812, and a ROM 2813. The CPU 2811 can control various operations to be performed by the PC. The RAM 2812 is functionally operable as a work memory that stores data temporarily when the CPU 2811 performs calculations. The ROM 2813 stores a boot program of the PC, which is used to activate the PC.

The controller unit 2810 further includes a hard disk drive (HDD) 2814, a display I/F 2815, and a network I/F 2816. The HDD 2814 stores software programs and various settings relating to the controls of the PC and documents having been saved. The display I/F 2815 is an interface capable of communicating with the display device 2710 to output information to be displayed on the display device 2710. The network I/F 2816 is an interface capable of inputting/outputting information (or data) from/to the multifunction peripheral 2605 via the network 160.

The controller unit 2810 further includes an input I/F 2817 as an interface capable of communicating with the mouse 2910 and the keyboard 3010 to receive information input from each device. The above-described functional units 2811 to 2817 are mutually connected via a bus 2818. The mouse 2910 is functionally operable as an input device that allows a user to move a mouse pointer displayed on the display device 2710 when the user inputs a selection or determination result to the PC. The keyboard 3010 is functionally operable as an input device usable to input characters. In the following description, the PC 2601 serves as the host and the multifunction peripheral 2605 serves as a printing device.

Hereinafter, example formats of information that can be transmitted or received between processing processes according to the present exemplary embodiment are described in detail below with reference to FIGS. 3F to 3N.

FIG. 3F illustrates an example format of a job ID notice D306. The job ID notice D306 illustrated in FIG. 3F is a packet including an identification bit area A901 that indicates a job ID notice and a job ID area A902 that stores job identification ID thereof. The job ID notice D306 can be transmitted from multifunction peripheral initialization processing to host initialization processing of the host 2601 in the processing of step S3903 to be performed by the multifunction peripheral 2605, as described below.

FIG. 3G illustrates an example format of a host initialization processing termination notice D307. The host initialization processing termination notice D307 illustrated in FIG. 3G is a packet including an identification bit area A1001 that indicates a host initialization processing completion notice and a job ID area A1002 that stores job identification ID thereof. The host initialization processing termination notice D307 can be transmitted from the host initialization processing to the print processing of the multifunction peripheral 2605 in the processing of step S3214 to be performed by the host 2601 as described below.

FIG. 3H illustrates an example format of a preview request D308. The preview request D308 illustrated in FIG. 3H is a packet including an identification bit area A1101 that indicates a preview request, a job ID area A1102 that stores job identification ID thereof, and an area A1103 that stores a preview requested page number. The preview request D308 can be transmitted from preview request and display processing to rendering processing of the multifunction peripheral 2605 in the processing of step S3403 to be performed by the host 2601 as described below.

FIG. 3I illustrates an example format of a preview data D309. The preview data D309 illustrated in FIG. 3I is a packet including an identification bit area A1201 that indicates preview data, a job ID area A1202 that stores job identification ID thereof, an area A1203 that stores a page number, and an area A1204 that stores a preview image. The preview data D309 can be transmitted from the rendering processing to the preview request and display processing of the host 2601 in the processing of step S4008 to be performed by the multifunction peripheral 2605, as described below.

FIG. 3J illustrates an example format of a job interrupt instruction D310. The job interrupt instruction D310 illustrated in FIG. 3J is a packet including an identification bit area A1301 that indicates a job interrupt instruction and a job ID area A1302 that stores job identification ID thereof. The job interrupt instruction D310 can be transmitted from click standby processing to the preview processing of the same host and to the print processing of the multifunction peripheral 2605 in the processing of step S3604 to be performed by the host 2601 as described below.

FIG. 3K illustrates an example format of a job abandonment instruction D311. The job abandonment instruction D311 illustrated in FIG. 3K is a packet including an identification bit area A1401 that indicates a job abandonment instruction, a job ID area A1402 that stores job identification ID thereof, and an area A1403 that stores a page number that represents a cancellation start point. The job abandonment instruction D311 can be transmitted from the click standby processing to the preview processing of the same host and to the rendering processing and the print processing of the multifunction peripheral 2605 in the processing of step S3608 to be performed by the host 2601 as described below.

FIG. 3L illustrates an example format of a job resumption instruction D312. The job resumption instruction D312 illustrated in FIG. 3L is a packet including an identification bit area A1501 that indicates a job resumption instruction and a job ID area A1502 that stores job identification ID thereof. The job resumption instruction D312 can be transmitted from the click standby processing to the preview processing of the same host and to the print processing of the multifunction peripheral 2605 in the processing of step S3611 to be performed by the host 2601 as described below.

FIG. 3M illustrates an example format of a paper feeding notice D313. The paper feeding notice D313 illustrated in FIG. 3M is a packet including an identification bit area A1601 that indicates a paper feeding notice, a job ID area A1602 that stores job identification ID thereof, and an area A1603 that stores a page number to be printed on the paper to be fed next. The paper feeding notice D313 can be transmitted from the print processing to the preview processing of the host 2601 in the processing of step S4106 to be performed by the multifunction peripheral 2605 as described below.

FIG. 3N illustrates an example format of a print completion notice D314. The print completion notice D314 illustrated in FIG. 3N is a packet including an identification bit area A1701 that indicates a print completion notice and a job ID area A1702 that stores job identification ID thereof. The print completion notice D314 can be transmitted from the print processing to the rendering processing of the same host and to the click standby processing of the host 2601 in the processing of step S4119 to be performed by the multifunction peripheral 2605 as described below.

Next, an example procedure of processing that can be performed by the host 2601 according to the present exemplary embodiment is described below. Hereinafter, an example flow of overall processing that can be performed by the host according to the present exemplary embodiment is described in detail below with reference to a flowchart illustrated in FIG. 14.

Figure 14:
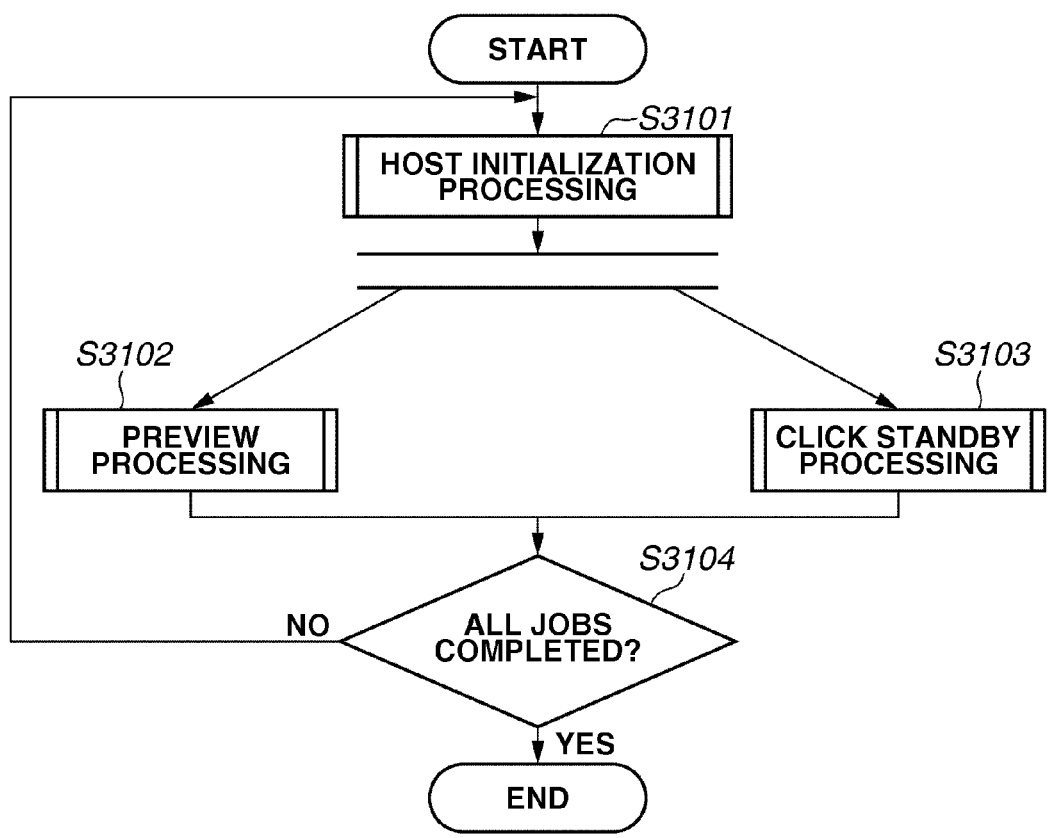
FIG. 14 is a flowchart illustrating an example method for controlling the information processing apparatus according to the second exemplary embodiment.

FIG. 14 is a flowchart illustrating an example method for controlling the information processing apparatus according to the present exemplary embodiment. The processing content illustrated in FIG. 14 is a detailed procedure of the overall processing that can be performed by the host according to the second exemplary embodiment. To realize each step of the flowchart illustrated in FIG. 14, the CPU 2811 of the controller unit 2810 of the information processing apparatus executes a related program loaded from the HDD 2814.

First, if a user transmits a print job to the multifunction peripheral 2605, then in step S3101, the CPU 2811 performs host initialization processing. If the initialization processing is completed, then in step S3102, the CPU 2811 performs preview processing for displaying a preview image of a print image. Meanwhile, in step S3103, the CPU 2811 performs click standby processing for waiting until the user clicks on a preview image displayed on the display device 2710. In the present exemplary embodiment, the CPU 2811 can independently perform the processing of step S3102 and step S3103 in a parallel fashion. The processing to be performed in step S3101, step S3102, and step S3103 is described in detail below.

If the above-described processing in step S3102 and step S3103 has been completed thoroughly, then in step S3104, the CPU 2811 determines whether the processing has been completed for all jobs. If the CPU 2811 determines that the processing has been completed for all jobs (YES in step S3104), the CPU 2811 terminates the host processing of the flowchart illustrated in FIG. 14. On the other hand, if the CPU 2811 determines that the processing is not yet completed for all jobs (NO in step S3104), the processing returns to step S3101. Hereinafter, an example flow of the host initialization processing is described in detail below with reference to a flowchart illustrated in FIG. 15 and illustrations in FIGS. 16A to 16C.

FIG. 15 is a flowchart illustrating an example method for controlling the information processing apparatus according to the present exemplary embodiment. The processing content illustrated in FIG. 15 is a detailed procedure of the host initialization processing according to the second exemplary embodiment. To realize each step of the flowchart illustrated in FIG. 15, the CPU 2811 of the controller unit 2810 of the information processing apparatus executes a related program loaded from the HDD 2814.

First, in step S3201, the CPU 2811 determines whether the number of view slots has been selected previously by a user. If the number of the view slots is already stored in the HDD 2814, the CPU 121 determines that the number of view slots has been already selected by the user (YES in step S3201). The processing proceeds directly to step S3204 while skipping steps S3202 and S3203.

Figure 16A:
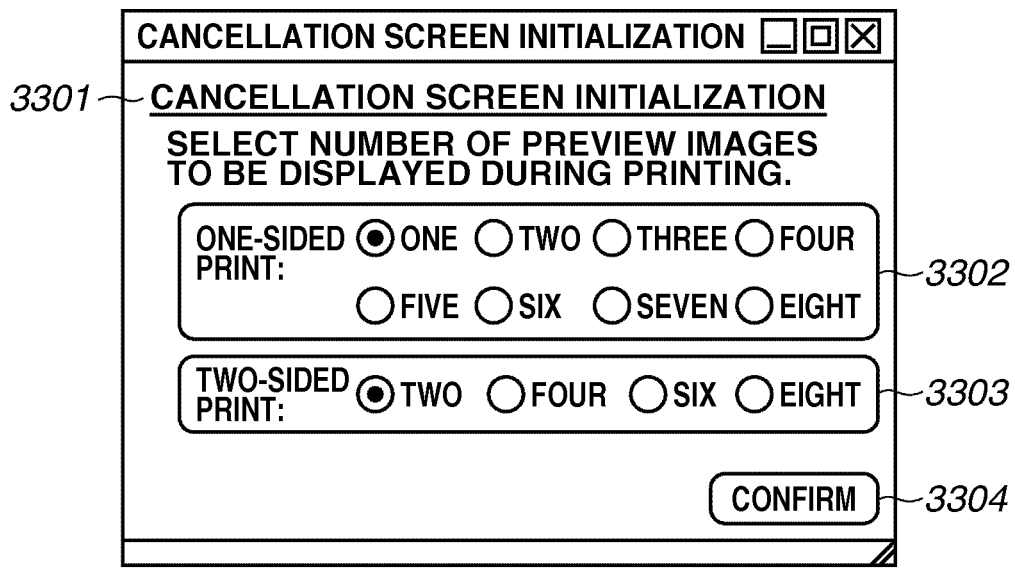
FIGS. 16A, 16B, and 16C illustrate examples of the UI screen that can be displayed by the information processing apparatus according to the second exemplary embodiment.

On the other hand, if the CPU 2811 determines that the number of view slots is not yet stored (NO in step S3201), then in step S3202, the CPU 2811 displays a number-of-view-slots selection screen on the display device 2710. FIG. 16A illustrates an example of the number-of-view-slots selection screen.

The selection screen illustrated in FIG. 16A includes an area 3301 in which an explanation of the function screen is displayed, an area 3302 in which the number of view slots for the preview images to be displayed during one-sided printing is selectable, and an area 3303 in which the number of view slots for the preview images to be displayed during two-sided printing is selectable. The user can select a desired number of preview images for each of the one-sided printing and the two-sided printing by clicking a desired number of preview images displayed in each of the area 3302 and the area 3303. A button 3304 allows the user to confirm the selected number of view slots for the preview images to be displayed.

Figure 16B:
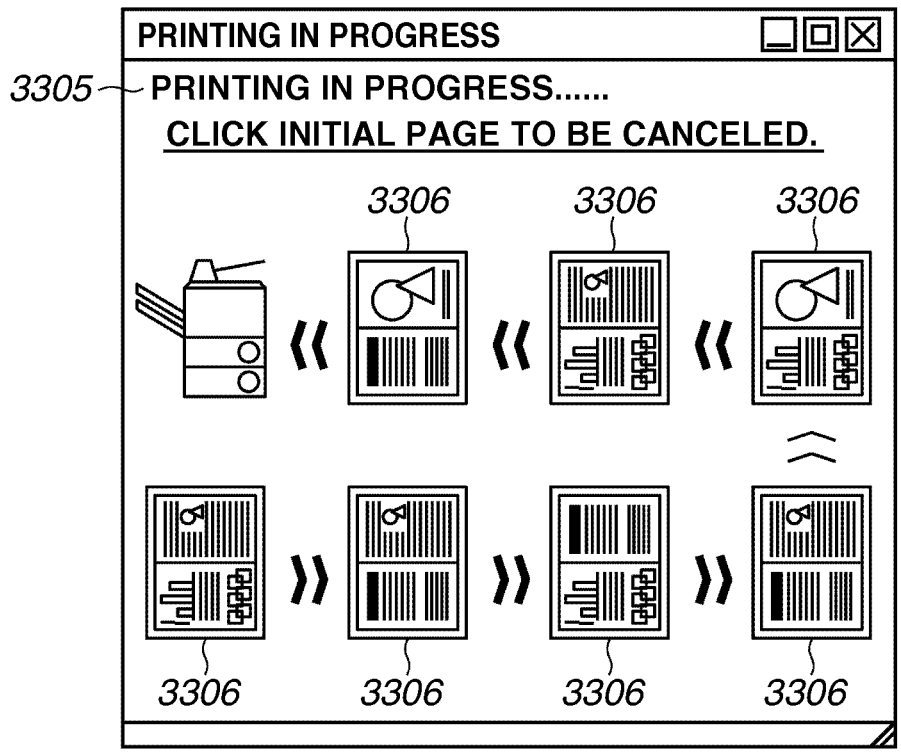

If the button 3304 has been clicked by the user, then in step S3203, the controller unit 2810 accepts the number of view slots selected by the user and stores the number of preview images to be displayed in the one-sided printing and in the two-sided printing in the HDD 2814. Then, in step S3204, the CPU 2811 determines whether the print setting of the present print job is the two-sided printing. If the CPU 2811 determines that the print setting is not the two-sided printing (NO in step S3204), then in step S3205, the CPU 2811 displays a one-sided mode cancellation screen on the display device 2710. FIG. 16B illustrates an example of the one-sided mode cancellation screen.

According to the example illustrated in FIG. 16B, there are seven view slots and the explanation of the function screen is displayed in an area 3305. Each preview image 3306 represents a page whose print processing is cancellable at present. The multifunction peripheral performs print processing according to the order of sequentially aligned preview images, from the first preview image 3306 positioned nearest to a printer icon. The user can click any preview image 3306 to cancel the printing of the clicked page and subsequent pages.

Figure 16C:
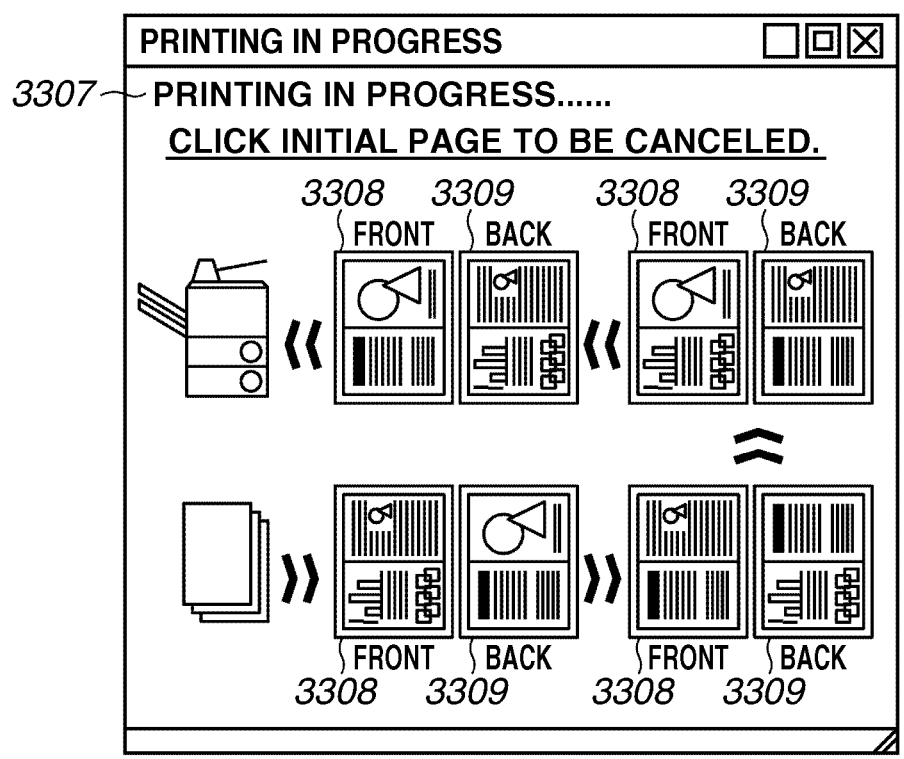

On the other hand, if the CPU 2811 determines that the print setting of the present print job is the two-sided printing (YES in step S3204), then in step S3206, the CPU 2811 displays a two-sided mode cancellation screen on the display device 2710. FIG. 16C illustrates an example of the two-sided mode cancellation screen.

According to the example illustrated in FIG. 16C, there are eight view slots and the explanation of the function screen is displayed in an area 3307. Each preview image 3308 represents a front page whose print processing is cancellable at present. Each preview image 3309 represents a back page whose print processing is cancellable at present. Each combination of the preview image 3308 and the preview image 3309 represents the front and back pages to be printed on the same paper. The order of the preview image 3308 and the preview image 3309 disposed on the screen represents the order of print. The user can click any preview image 3308 or 3309 to cancel the printing of the clicked page and subsequent pages.

If the cancellation screen display processing is completed, then in step S3207, the CPU 2811 determines whether the job ID notice D306 (i.e., the notice to be transmitted from the multifunction peripheral 2605 in step S3903) has been received. If it is confirmed that the job ID notice 306 has been received (YES in step S3207), then in step S3208, the CPU 2811 reads the job ID from the area A902 of the job ID notice D306 and stores the read job ID information in the HDD 2814.

The job ID is a unique ID representing each job and can be determined by the multifunction peripheral 2605. If one of the host 2601 and the multifunction peripheral 2605 receives information from the other, it is checked whether the job ID included in the received information coincides with the job ID of the present job.

Then, in step S3209, the CPU 2811 performs preview request and display processing as described in detail below. Then, in step S3210, the CPU 2811 determines whether the print setting of the present print job is the two-sided printing. If the CPU 2811 determines that the print setting is not the two-sided printing (NO in step S3210), the processing proceeds directly to step S3212 while skipping step S3211.

On the other hand, if the CPU 2811 determines that the print setting of the present print job is the two-sided printing (YES in step S3210), then in step S3211, the CPU 2811 performs preview request and display processing for the back page. The content of the processing to be performed in step S3211 is similar to that of the processing described in step S3209.

Then, in step S3212, the CPU 2811 determines whether the number of the presently displayed preview images is less than the number of view slots. If the CPU 2811 determines that number of the presently displayed preview images is not less than the number of view slots (NO in step S3212), the processing proceeds directly to step S3214 while skipping step S3213.

On the other hand, if the CPU 2811 determines that the number of the presently displayed preview images is less than the number of view slots (YES in step S3212), more specifically, if it is determined that an additional preview image can be displayed on the cancellation screen, the processing proceeds to step S3213. Then, in step S3213, the CPU 2811 determines whether a page whose preview image is yet to be displayed is present in the document to be printed. If the CPU 2811 determines that there is at least one page that is yet to be subjected to the preview display processing (YES in step S3213), the processing returns to step S3209.

On the other hand, if the CPU 2811 determines that there is not any page that is yet to be subjected to the preview display processing (NO in step S3213), namely if it is determined that the preview display has been completed for all pages, the processing proceeds to step S3214. Then, in step S3214, the CPU 2811 transmits the host initialization processing termination notice D307 to the multifunction peripheral 2605 via the network 160 and terminates the present processing of the flowchart illustrated in FIG. 15.

An example flow of the preview request and display processing is described in detail below with reference to a flowchart illustrated in FIG. 17.

FIG. 17 is a flowchart illustrating an example method for controlling the information processing apparatus according to the second exemplary embodiment. The processing content illustrated in FIG. 17 is a detailed procedure of the preview request and display processing according to the second exemplary embodiment. To realize each step of the flowchart illustrated in FIG. 17, the CPU 2811 of the controller unit 2810 of the information processing apparatus executes a related program loaded from the HDD 2814.

First, in step S3401, the CPU 2811 determines whether the number of preview images presently displayed on the cancellation screen is less than the number of view slots. If the CPU 2811 determines that the number of preview images is not less than the number of view slots (NO in step S3401), namely if it is determined that no more preview image can be displayed on the cancellation screen, the CPU 2811 terminates the processing illustrated in FIG. 17.

On the other hand, if the CPU 2811 determines that the number of the presently displayed preview images is less than the number of view slots (YES in step S3401), namely if it is determined that an additional preview image can be displayed on the cancellation screen, then in step S3402, the CPU 2811 acquires the rearmost page from the preview images displayed presently on the cancellation screen.

Subsequently, in step S3403, the CPU 2811 transmits the preview request D308 to the multifunction peripheral 2605 via the network 160. The preview request D308 transmitted in this case includes the job ID (i.e., information stored in the HDD 2814) in the area A1102 and the next page following the rearmost page in the area A1103.

Then, in step S3404, the CPU 2811 determines whether the preview data D309 (i.e., the data to be transmitted from the multifunction peripheral 2605 in step S4008) has been received. If the CPU 2811 determines that the preview data D309 has been received from the multifunction peripheral 2605 (YES in step S3404), then in step S3405, the CPU 2811 acquires a preview data image from the area A1204 of the preview data D309.

Subsequently, in step S3406, the CPU 2811 displays the preview image (i.e., the image acquired in step S3405) in a leading available slot of the cancellation screen displayed on the display device 2710. Then, the CPU 2811 terminates the processing of the flowchart illustrated in FIG. 17.

Hereinafter, an example flow of the preview processing is described in detail below with reference to a flowchart illustrated in FIG. 18.

Figure 18:
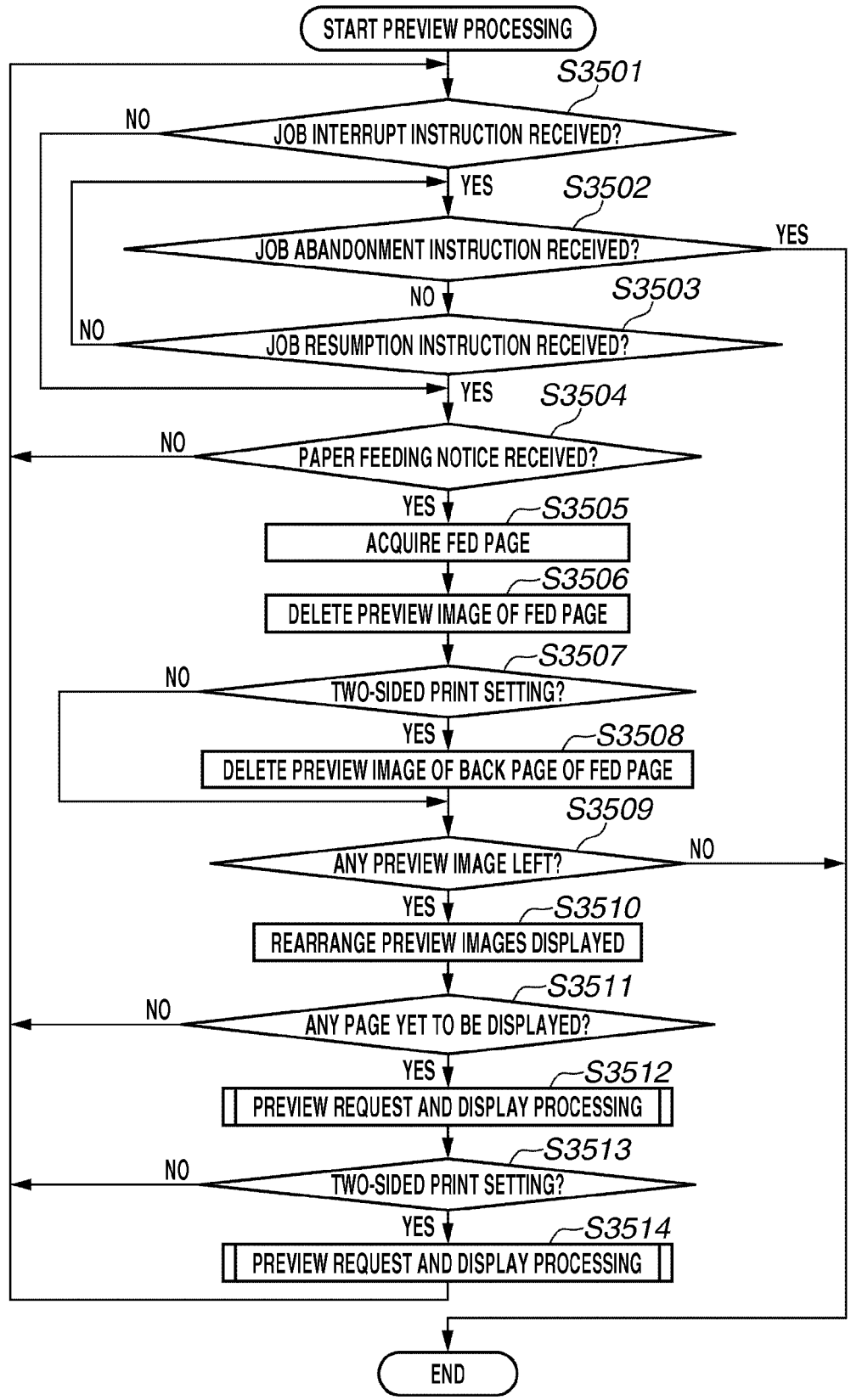
FIG. 18 is a flowchart illustrating an example method for controlling the information processing apparatus according to the second exemplary embodiment.

FIG. 18 is a flowchart illustrating an example method for controlling the information processing apparatus according to the present exemplary embodiment. The processing content illustrated in FIG. 18 is a detailed procedure of the preview processing according to the second exemplary embodiment. To realize each step of the flowchart illustrated in FIG. 18, the CPU 2811 of the controller unit 2810 of the information processing apparatus executes a related program loaded from the HDD 2814.

First, in step S3501, the CPU 2811 determines whether the job interrupt instruction D310 (i.e., the instruction to be transmitted in step S3604) has been received. If the CPU 2811 determines that the job interrupt instruction D310 is not yet received (NO in step S3501), the processing proceeds directly to step S3504 while skipping steps S3502 and S3503.

On the other hand, if the CPU 2811 determines that the job interrupt instruction D310 has been received (YES in step S3501), then in step S3502, the CPU 2811 determines whether the job abandonment instruction D311 (i.e., the instruction to be transmitted in step S3608) has been received. If the CPU 2811 determines that the job abandonment instruction D311 has been received (YES in S3502), the CPU 2811 terminates the processing of the flowchart illustrated in FIG. 18.

On the other hand, if the CPU 2811 determines that the job abandonment instruction D311 is not yet received (NO in step S3502), then in step S3503, the CPU 2811 determines whether the job resumption instruction D312 (i.e., the instruction to be transmitted in step S3611) has been received. If the CPU 2811 determines that the job resumption instruction D312 is not yet received (NO in step S3503), the processing returns to step S3502. On the other hand, if the CPU 2811 determines that the job resumption instruction D312 has been received (YES in step S3503), the processing proceeds to step S3504.

Then, in step S3504, the CPU 2811 determines whether the paper feeding notice D313 (i.e., the notice to be transmitted from the multifunction peripheral 2605 in step S4106) has been received. If the CPU 2811 determines that the paper feeding notice D313 is not yet received (NO in step S3504), the processing returns to step S3501. On the other hand, if the CPU 2811 determines that the paper feeding notice D313 has been received (YES in step S3504), then in step S3505, the CPU 2811 reads a page to be printed on the paper having been fed (hereinafter, referred to as "fed page") from the area A1603 of the paper feeding notice D313. It is now assumed that, in the case of two-sided printing, only the page to be printed on the front side is stored as a fed page in the area A1603.

Then, in step S3506, the CPU 2811 deletes the preview image of the fed page from the cancellation screen displayed on the display device 2710. Subsequently, in step S3507, the CPU 2811 determines whether the print setting of the present print job is the two-sided printing. If the CPU 2811 determines that the print setting is not the two-sided printing (NO in step S3507), the processing proceeds directly to step S3509 while skipping step S3508. On the other hand, if it is determined that the print setting is the two-sided printing (YES in step S3507), then in step S3508, the CPU 2811 deletes the preview image of the back page of the fed page from the cancellation screen displayed on the display device 2710.

Subsequently, in step S3509, the CPU 2811 determines whether the preview image is still present on the cancellation screen displayed on the display device 2710. If the CPU 2811 determines that the preview image is not present, more specifically if the preview images of all pages are deleted (NO in step S3509), the CPU 2811 terminates the preview processing of the flowchart illustrated in FIG. 18. On the other hand, if CPU 2811 determines that the preview images are still present (YES in step S3509), then in step S3510, the CPU 2811 rearranges the presently displayed preview images in such a way as to eliminate any available slot when caused due to deletion of a preview image.

Then, in step S3511, the CPU 2811 determines whether a page whose preview image is yet to be displayed is present on the cancellation screen although it is included in a print range.

If the CPU 2811 determines that a non-displayed page is not present (NO in step S3511), more specifically if it is unnecessary to generate a new preview image, the processing returns to step S3501.

On the other hand, if the CPU 2811 determines that a page whose preview is yet to be displayed is present in the cancellation screen (YES in step S3511), then in step S3512, the CPU 2811 performs preview request and display processing. The content of the processing to be performed in step S3512 is similar to that of the above-described preview request and display processing.

Subsequently, in step S3513, the CPU 2811 determines whether the print setting of the present print job is the two-sided printing. If the CPU 2811 determines that the print setting is not the two-sided printing (NO in step S3513), the processing returns to step S3501. On the other hand, if it is determined that the print setting is the two-sided printing (YES in step S3513), then in step S3514, the CPU 2811 performs preview request and display processing for the back page. Then, the processing returns to step S3501. The content of the processing to be performed in step S3514 is similar to that of the processing described in step S3512.

Figure 20A:
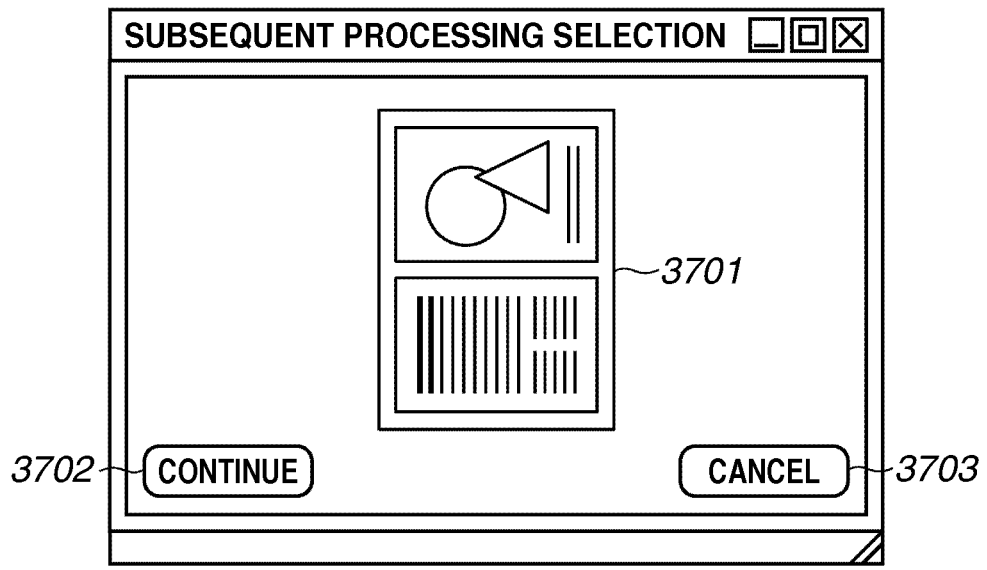
FIGS. 20A and 20B illustrate examples of the UI screen that can be displayed by the information processing apparatus according to the second exemplary embodiment.
Figure 20B:
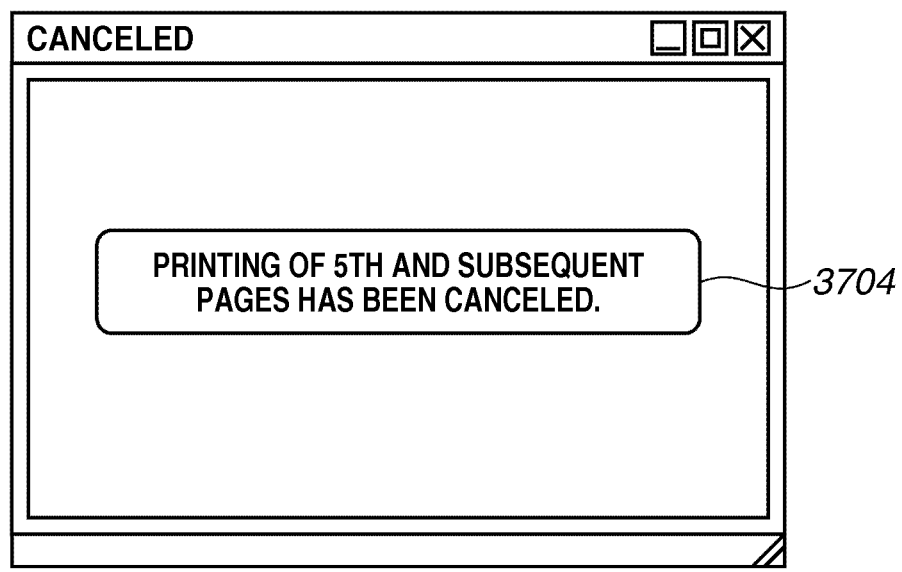

Hereinafter, an example flow of the click standby processing is described in detail below with reference to a flowchart illustrated in FIG. 19 and illustrations in FIGS. 20A and 20B.

FIG. 19 is a flowchart illustrating an example method for controlling the information processing apparatus according to the present exemplary embodiment. The processing content illustrated in FIG. 19 is a detailed procedure of the click standby processing according to the second exemplary embodiment. To realize each step of the flowchart illustrated in FIG. 19, the CPU 2811 of the controller unit 2810 of the information processing apparatus executes a related program loaded from the HDD 2814.

First, in step S3601, the CPU 2811 determines whether the print completion notice D314 (i.e., the notice to be transmitted from the multifunction peripheral 2605 in step S4119) has been received. If the CPU 2811 determines that the print completion notice D314 has been received (YES in step S3601), the CPU 2811 terminates the click standby processing of the flowchart illustrated in FIG. 19.

On the other hand, if the CPU 2811 determines that the print completion notice D314 is not yet received (NO in step S3601), then in step S3602, the CPU 2811 determines whether any one of the preview images has been clicked on the cancellation screen displayed on the display device 2710. If the CPU 2811 determines that any one of the preview images is not yet clicked (NO in step S3602), the processing returns to step S3601.

On the other hand, if the CPU 2811 determines that any one of the preview images has been clicked (YES in step S3602), then in step S3603, the CPU 2811 acquires a clicked page. Then, in step S3604, the CPU 2811 transmits the job interrupt instruction D310 to the preview processing of the same host and further transmits the job interrupt instruction D310 to the multifunction peripheral 2605 via the network 160.

Subsequently, in step S3605, the CPU 2811 stores the present status of the cancellation screen in the HDD 2814. Then, in step S3606, the CPU 2811 displays a subsequent processing selection screen on the display device 2710. FIG. 20A illustrates an example of the subsequent processing selection screen. In FIG. 20A, the clicked preview image is displayed in an area 3701. A continuation button 3702 can be pressed to release the present job from the interruption and continue the processing of the present job. A cancellation button 3703 can be pressed to cancel the present job.

Then, in step S3607, the CPU 2811 determines whether the cancellation button 3703 has been clicked by the user. If the CPU 2811 determines that the cancellation button 3703 has been clicked (YES in step S3607), the processing proceeds to step S3608. In step S3608, the CPU 2811 generates the job abandonment instruction D311 and transmits the job abandonment instruction D311 to the preview processing. The job abandonment instruction D311 transmitted in this case includes the area A1403 that stores the clicked page number acquired in step S3603. Further, the CPU 2811 transmits the job abandonment instruction D311 to the multifunction peripheral 2605 via the network 160.

Then, in step S3609, the CPU 2811 displays a cancellation completion screen on the display device 2710 and terminates the click standby processing of the flowchart illustrated in FIG. 19. FIG. 20B illustrates an example of the cancellation completion screen. The screen illustrated in FIG. 20B includes an area 3704 in which a message that informs cancellation of the present job is displayed together with the page number that represents the cancellation start point. More specifically, according to the cancellation completion screen illustrated in FIG. 20B, the clicked page is the fifth page and it is understood that the printing of the fifth page and subsequent pages has been canceled.

On the other hand, if the CPU 2811 determines that the cancellation button 3703 is not yet clicked (NO in step S3607), then in step S3610, the CPU 2811 determines whether the continuation button 3702 has been clicked by the user. If the CPU 2811 determines that the continuation button 3702 has been clicked (YES in step S3610), then in step S3611, the CPU 2811 transmits the job resumption instruction D312 to the preview processing of the same host. Further, the CPU 2811 transmits the job resumption instruction D312 to the multifunction peripheral 2605 via the network 160.

Then, in step S3612, the CPU 2811 deletes the subsequent processing selection screen displayed on the display device 2710 and displays the cancellation screen on the display device 2710 in such a way as to restore the cancellation screen state having been stored. Then, the processing returns to step S3601.

Next, an example procedure of the processing that can be performed by the multifunction peripheral 2605 according to the present exemplary embodiment is described below. An example flow of the processing that can be performed by the image forming apparatus according to the present exemplary embodiment is described in detail below with reference to a flowchart illustrated in FIG. 21.

Figure 21:
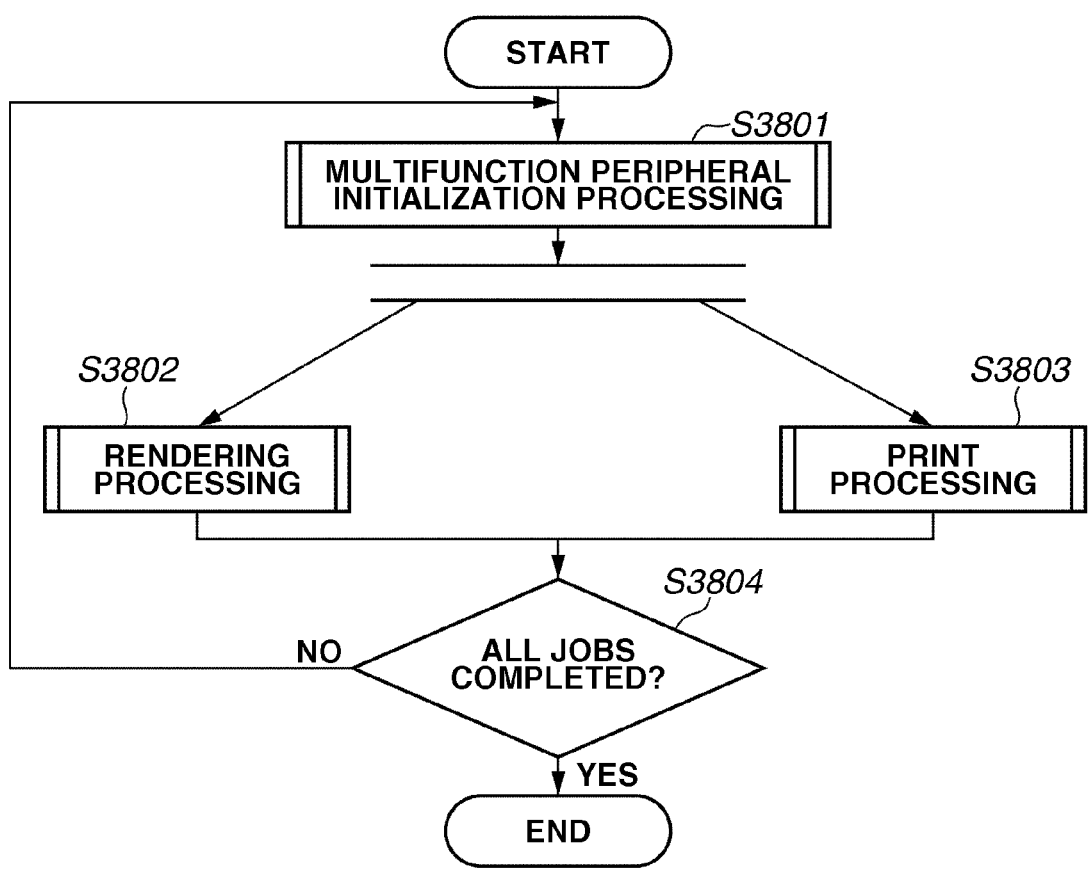
FIG. 21 is a flowchart illustrating an example method for controlling the image forming apparatus according to the second exemplary embodiment.

FIG. 21 is a flowchart illustrating an example method for controlling the image forming apparatus according to the present exemplary embodiment. The processing content illustrated in FIG. 21 is an example of the overall processing according to the image forming apparatus. To realize each step of the flowchart illustrated in FIG. 21, the CPU 121 of the controller unit 120 of the multifunction peripheral executes a related program loaded from the HDD 124.

First, in step S3801, the CPU 121 performs multifunction peripheral initialization processing. If the initialization processing is completed, then in step S3802, the CPU 121 performs rendering processing. Further, in step S3803, the CPU 121 performs print processing. In the present exemplary embodiment, the CPU 121 can independently perform the processing of step S3802 and step S3803 in a parallel fashion. The processing to be performed in step S3801, step S3802, and step S3803 is described in detail below.

If the processing in step S3802 and step S3803 is completed thoroughly, then in step S3804, the CPU 121 determines whether the processing has been completed for all jobs.

If the CPU 121 determines that the processing has been completed for all jobs (YES in step S3804), the CPU 121 terminates the multifunction peripheral processing of the flowchart illustrated in FIG. 21. On the other hand, if the CPU 121 determines that the processing is not yet completed for all jobs (NO in step S3804), the processing returns to step S3801. Hereinafter, an example flow of the multifunction peripheral initialization processing is described in detail below with reference to a flowchart illustrated in FIG. 22.

Figure 22:
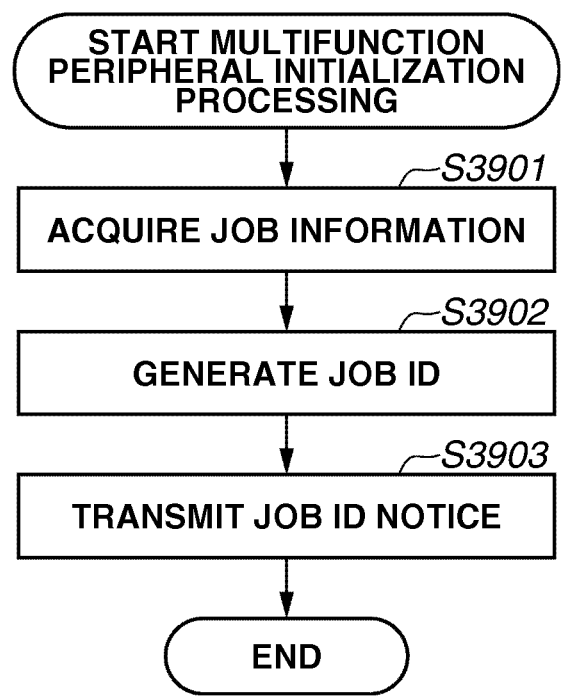
FIG. 22 is a flowchart illustrating an example method for controlling the image forming apparatus according to the second exemplary embodiment.

FIG. 22 is a flowchart illustrating an example method for controlling the image forming apparatus according to the present exemplary embodiment. The processing content illustrated in FIG. 22 is an example of the multifunction peripheral initialization processing that relates to the image forming apparatus. To realize each step of the flowchart illustrated in FIG. 22, the CPU 121 of the controller unit 120 of the multifunction peripheral executes a related program loaded from the HDD 124.

First, in step S3901, the CPU 121 acquires information relating to a job received from the host 2601 and stores the acquired information in the HDD 124. Subsequently, in step S3902, the CPU 121 generates a job ID that corresponds to the received job. Then, in step S3903, the CPU 121 transmits the job ID generated in step S3902 to the host 2601 via the network 160. The job ID transmitted in this case includes the job ID notice D306 stored in the area A902. Then, the CPU 121 terminates the multifunction peripheral initialization processing of the flowchart illustrated in FIG. 22.

Hereinafter, an example flow of the rendering processing is described in detail below with reference to a flowchart illustrated in FIG. 23.

Figure 23:
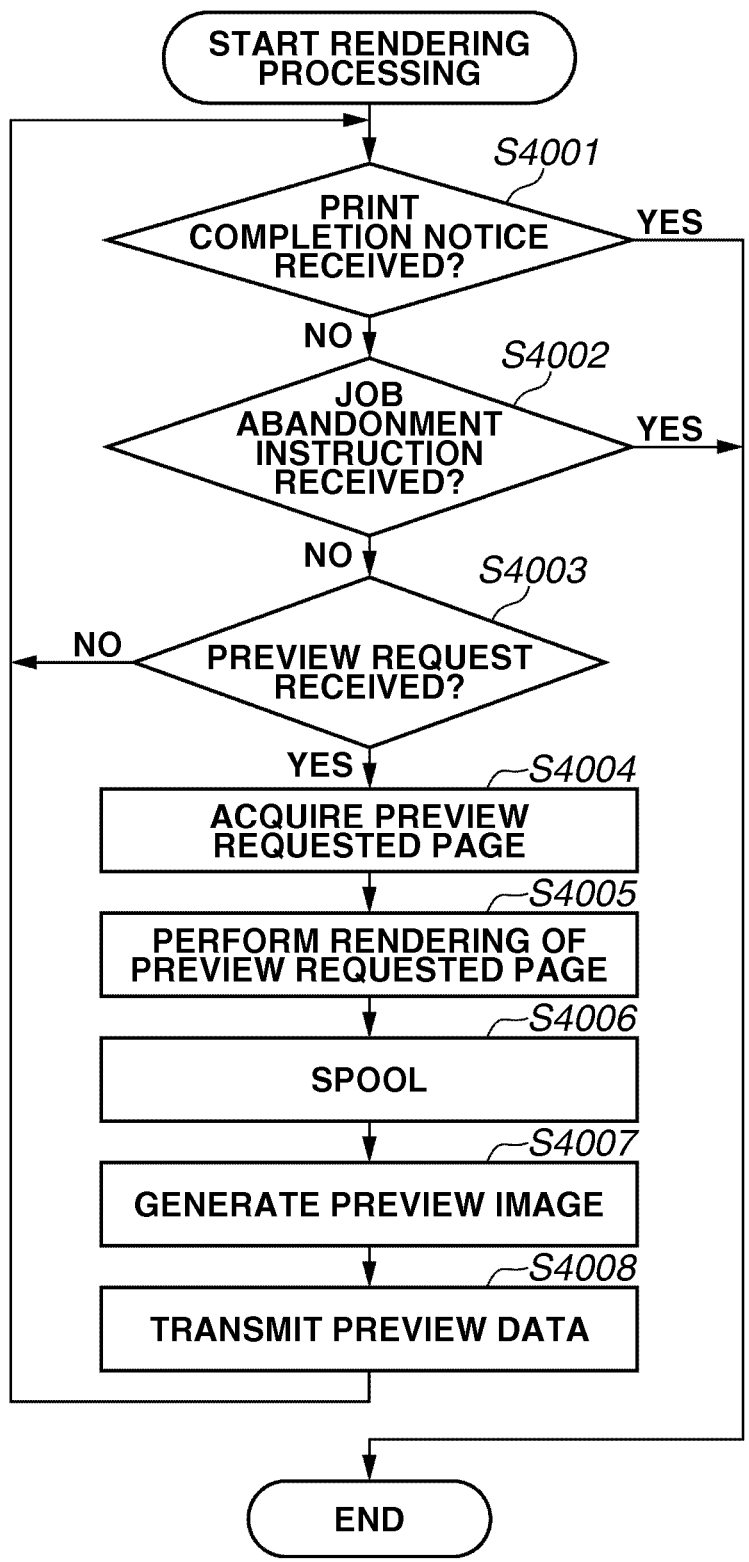
FIG. 23 is a flowchart illustrating an example method for controlling the image forming apparatus according to the second exemplary embodiment.

FIG. 23 is a flowchart illustrating an example method for controlling the image forming apparatus according to the present exemplary embodiment. The processing content illustrated in FIG. 23 is an example of the rendering processing that relates to the image forming apparatus. To realize each step of the flowchart illustrated in FIG. 23, the CPU 121 of the controller unit 120 of the multifunction peripheral executes a related program loaded from the HDD 124. First, in step S4001, the CPU 121 determines whether the print completion notice D314 (i.e., the notice to be transmitted in step S4119 illustrated in FIG. 24) has been received. If the CPU 121 determines that the print completion notice D314 has been received (YES in step S4001), the CPU 121 terminates the rendering processing of the flowchart illustrated in FIG. 23.

On the other hand, if the CPU 121 determines that the print completion notice D314 is not yet received (No in step S4001), then in step S4002, the CPU 121 determines whether the job abandonment instruction D311 (i.e., the instruction transmitted from the host 2601 in step S3608) has been received. In the CPU 121 determines that the job abandonment instruction D311 has been received (YES in step S4002), the CPU 121 terminates the rendering processing of the flowchart illustrated in FIG. 23.

On the other hand, if the CPU 121 determines that the job abandonment instruction D311 is not yet received (NO in step S4002), then in step S4003, the CPU 121 determines whether the preview request D308 (i.e., the request transmitted from the host 2601 in step S3403) has been received. If the CPU 121 determines that the preview request D308 is not yet received (NO in step S4003), the processing returns to step S4001.

On the other hand, if the CPU 121 determines that the preview request D308 has been received (YES in step S4003), then in step S4004, the CPU 121 acquires a preview requested page (requested by the host 2601) from the area A1103 of the preview request D308. Then, in step S4005, the CPU 121 sends the preview requested page acquired in step S4004 to the image editing image processing unit 136, the printer image processing unit 135, and the RIP 132 via the system bus 128, the image bus I/F 129, and the image bus 131, to generates a bitmap image. Further, the CPU 121 stores the generated bitmap image temporarily in the RAM 122. Subsequently, in step S4006, the CPU 121 makes a copy of the bitmap image generated in step S4005 and stores the obtained copy in the HDD 124 in association with the page number.

Subsequently, in step S4007, the CPU 121 performs thinning reduction processing on the bitmap image stored in the RAM 122 in such a way as to adjust the size of the bitmap image according to the view slot of the cancellation screen. Then, the CPU 121 stores the reduced bitmap image, as a preview image, in the HDD 124. Then, the CPU 121 deletes the bitmap image from the RAM 122 because the temporarily stored image is no longer used in the subsequent processing.

Then, in step S4008, the CPU 121 transmits the preview data D309 to the host 2601 via the network 160. The preview data D309 transmitted in this case includes the preview image generated in step S4007 in the area A1204 and the page number in the area A1203. Then, the processing returns to step S4001.

An example flow of the print processing is described in detail below with reference to a flowchart illustrated in FIG. 24.

Figure 24:
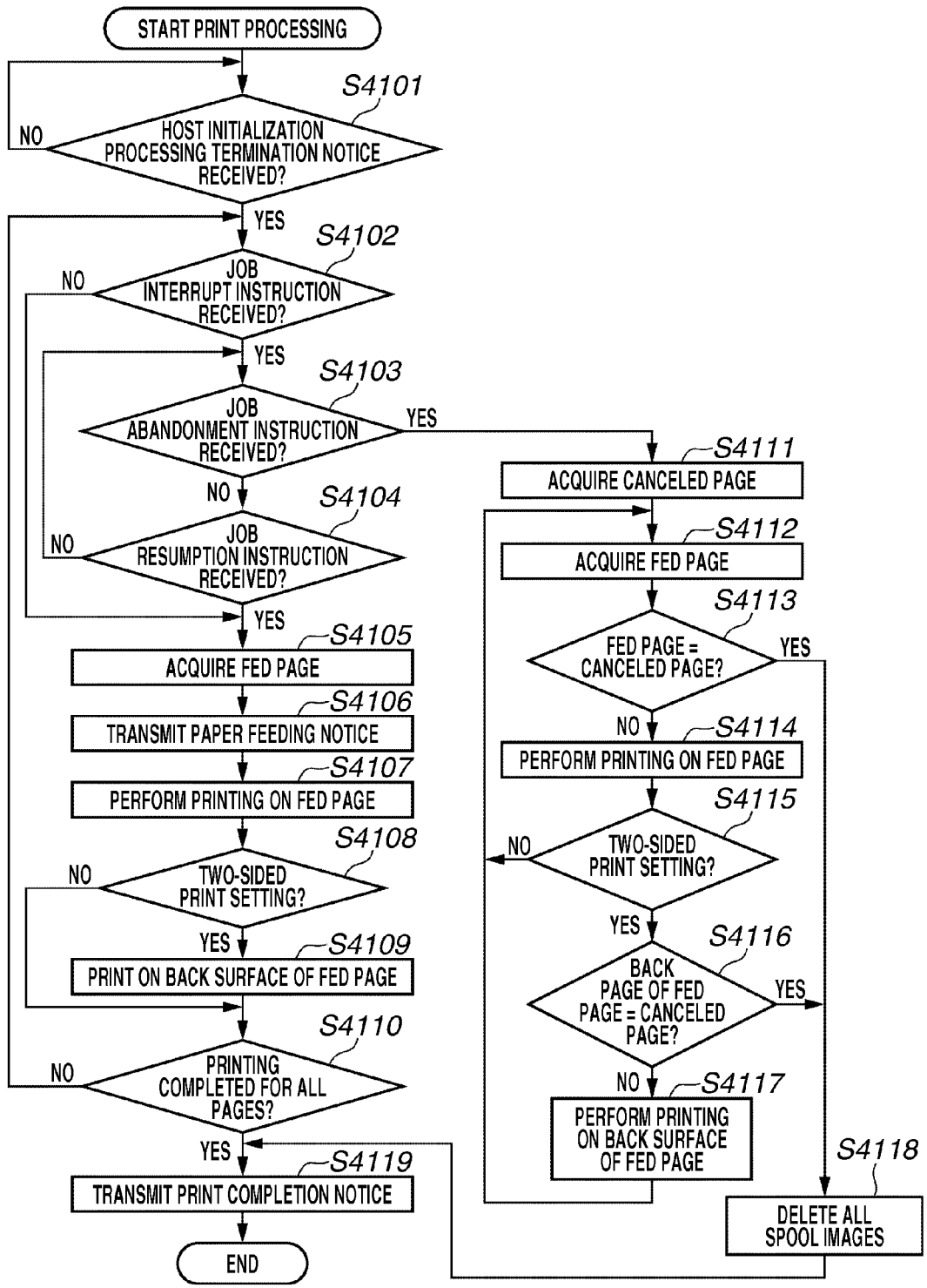
FIG. 24 is a flowchart illustrating an example method for controlling the image forming apparatus according to the second exemplary embodiment.

FIG. 24 is a flowchart illustrating an example method for controlling the image forming apparatus according to the present exemplary embodiment. The processing content illustrated in FIG. 24 is an example of the print processing that can be performed by the image forming apparatus. To realize each step of the flowchart illustrated in FIG. 24, the CPU 121 of the controller unit 120 of the multifunction peripheral executes a related program loaded from the HDD 124.

First, in step S4101, the CPU 121 determines whether the host initialization processing termination notice D307 (i.e., the notice transmitted from the host 2601 in step S3214) has been received. If the CPU 121 determines that the host initialization processing termination notice D307 has been received (YES in step S4101), then in step S4102, the CPU 121 determines whether the job interrupt instruction D310 (i.e., the instruction transmitted from the host 2601 in step S3604) has been received. If the CPU 121 determines that the job interrupt instruction D310 is not yet received (NO in step S4102), the processing proceeds directly to step S4105 while skipping steps S4103 and S4104.

On the other hand, if the CPU 121 determines that the job interrupt instruction D310 has been received (YES in step S4102), then in step S4103, the CPU 121 determines whether the job abandonment instruction D311 (i.e., the instruction transmitted from the host 2601 in step S3608) has been received. If it is determined that the job abandonment instruction D311 has been received (YES in step S4103), the processing proceeds to step S4111.

On the other hand, if the CPU 121 determines that the job abandonment instruction D311 is not yet received (NO in step S4103), then in step S4104, the CPU 121 determines whether the job resumption instruction D312 (i.e., the instruction transmitted from the host 2601 in step S3611) has been received. If the CPU 121 determines that the job resumption instruction D312 is not yet received (NO in step S4104), the processing returns to step S4103. On the other hand, if the CPU 121 determines that the job resumption instruction D312 has been received (YES in step S4104), the processing proceeds to step S4105.

Then, in step S4105, the CPU 121 acquires a page to be printed on the paper having been fed next (hereinafter, referred to as "fed page"). It is now assumed that, in the case of two-sided printing, the page to be printed on the front side is referred to as the fed page. Subsequently, in step S4106, the CPU 121 transmits a paper feeding notice D313 to the host 2601 via the network 160. The paper feeding notice D313 transmitted in this case includes the fed page stored in the area A1603 illustrated in FIG. 3M.

Then, in step S4107, the CPU 121 transmits a paper feeding start command to the paper feeder unit 170 via the paper feeder I/F 127. Further, in step S4107, the CPU 121 transmits the bitmap image of the fed page stored in the HDD 124 to the printer unit 150 via the device I/F 133 to perform print processing. In this case, the CPU 121 deletes the bitmap image of the fed page from the HDD 124 because the fed page is no longer used in the subsequent processing.

Subsequently, in step S4108, the CPU 121 determines whether the print setting of the present print job is the two-sided printing. If the CPU 121 determines that the print setting of the present print job is not the two-sided printing (NO step S4108), the processing proceeds directly to step S4110 while skipping step S4109. On the other hand, if the CPU 121 determines that the print setting of the present print job is the two-sided printing (YES in step S1408), then in step S4109, the CPU 121 performs printing on the back surface of the fed page (namely, performs processing similar to that described in step S4107).

Then, in step S4110, the CPU 121 determines whether the print processing has been completed for all pages. If it is determined that the print processing is not yet completed for all pages (NO in step S4110), the processing returns to step S4102. On the other hand, if the CPU 121 determines that the print processing has been completed for all pages (YES in step S4110), the processing proceeds to step S4119.

On the other hand, if the CPU 121 determines that the job abandonment instruction D311 has been received (YES in step S4103), then in step S4111, the CPU 121 reads a page clicked as a cancellation start point (hereinafter, referred to as "canceled page") from the area A1403 of the job abandonment instruction D311. Subsequently, in step S4112, the CPU 121 acquires the fed page in the same manner as the processing in step S4105. Then, in step S4113, the CPU 121 determines whether the fed page is the canceled page. If the CPU 121 determines that the fed page is the canceled page (YES in step S4113), the processing proceeds to step S4118.

On the other hand, if the CPU 121 determines that the fed page is not the canceled page (NO in step S4113), then in step S4114, the CPU 121 performs printing on the fed page according to a procedure similar to that described in step S4107. Subsequently, in step S4115, the CPU 121 determines whether the print setting of the present print job is the two-sided printing. If the CPU 121 determines that the print setting of the present print job is not the two-sided printing (NO in step S4115), the processing returns to step S4112.

On the other hand, if the CPU 121 determines that the print setting of the present print job is the two-sided printing (YES in step S4115), then in step S4116, the CPU 121 determines whether the back page of the fed page is the canceled page. If the CPU 121 determines that the back page of the fed page is the canceled page (YES in step S4116), the processing proceeds to step S4118.

On the other hand, if the CPU 121 determines that the fed page is not the canceled page (NO in step S4116), then in step S4117, the CPU 121 performs printing on the back surface of the fed page according to a procedure similar to that described in step S4109. Then, the processing returns to step S4112.

On the other hand, if the CPU 121 determines that the fed page is the canceled page (YES in step S4113 or step S4116), then in step S4118, the CPU 121 deletes all the bitmap images from the HDD 124 (i.e., deletes the images stored in step S4006).

Then, in step S4119, the CPU 121 performs transmission of the print completion notice D314 addressed to the rendering processing of the same host. Further, the CPU 121 transmits the print completion notice D314 to the host 2601 via the network 160. Then, the CPU 121 terminates the print processing of the flowchart illustrated in FIG. 24.

The system according to the present exemplary embodiment can identify an unnecessary print before confirming a printed product actually output in a printing operation using a host (e.g., a remote print). Further, the system according to the present exemplary embodiment can surely cancel the unnecessary print. The system according to the present exemplary embodiment allows users to confirm a print image whose print processing is cancellable and instruct cancellation or continuation of the print processing.

In the present exemplary embodiment, the number of preview slots to be displayed on the cancellation screen is selected by a user. However, the number of preview slots to be displayed on the cancellation screen can be automatically calculated with reference to the printing speed or print settings of each multifunction peripheral. For example, if a desired display time is set beforehand for a single preview image to be displayed on the cancellation screen, it is feasible to calculate the number of required slots based on the number of papers printable per second by the multifunction peripheral. In this case, it is unnecessary to change the settings each time a user switches the multifunction peripheral for a remote print.

Further, in the present exemplary embodiment, if a paper is once fed, it is unfeasible to cancel a print of a page to be printed on the fed paper. However, in some cases, it may be practical that the print is cancellable for a while after the paper is fed. For example, cancellation acceptance timing can be delayed appropriately. In this case, it is useful to estimate a paper conveyance distance based on a paper to be used or with reference to the configuration of an option unit and delay the transmission timing of the paper feeding notice according to the estimated distance.

In the above-described exemplary embodiment, it may be useful to switch the preview display method (for example, reduction in the number of preview images) according to the communication speed when the CPU 121 (i.e., the device performing the preview generation processing) communicates with the touch panel 201.

Further, in the above-described exemplary embodiment, the determination with respect to the acceptability of cancellation is performed by checking if a paper that corresponds to a page to be printed is already fed.

Alternatively, it is feasible to switch the determination condition considering the device configuration or print settings when the CPU 121 determines whether the print processing is cancellable. More specifically, if the CPU 121 checks the feeding state of a paper corresponding to the page to be displayed on the touch panel 201 when the CPU 121 determines whether the page to be displayed is the page whose print processing is still stoppable, it is feasible to adjust the determination timing with reference to the paper conveyance distance.

Further, the execution order of each step in the flowchart described in each of the above-described exemplary embodiments is changeable if it is appropriate. Further, apart of each flowchart can be combined with another functional processing step to provide a new control step.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-052394 filed Mar. 10, 2011, which is hereby incorporated by reference herein in its entirety.

What is claimed is:

1. An image forming apparatus; comprising:
a generation unit configured to acquire print information from an input print job and to generate a preview image for displaying, on a display unit, a page print image of a page to be printed whose print processing by a printing unit is still stoppable; and
a preview control unit configured to display the preview image generated by the generation unit on the display unit,
wherein the preview control unit is configured to adjust timing for determining whether the page, whose page print image is to be displayed on the display unit, is a page whose print processing is still stoppable, according to whether a paper corresponding to the page to be displayed is already fed, based on a conveyance distance of the paper.

2. The image forming apparatus according to claim 1, further comprising:
a reception unit configured to receive a user instruction indicating a page print image of any one instructed page of page print images displayed on the display unit; and
a print processing control unit configured to control continuation or cancellation of print processing for succeeding pages, including the instructed page whose page print image is displayed on the display unit, according to the user instruction received by the reception unit.

3. The image forming apparatus according to claim 1, wherein the preview control unit is configured to update a display status of a page print image of a page whose print processing is still stoppable according to a progress of the print processing by the printing unit.

4. The image forming apparatus according to claim 3, wherein the preview control unit is configured to determine a number of preview images to be displayed on the display unit based on a set number of view slots.

5. The image forming apparatus according to claim 1, wherein the preview control unit is configured to display page print images of a plurality of pages whose print processing is still stoppable, from a head page, on the display unit.

6. The image forming apparatus according to claim 1, wherein the preview control unit is configured to determine whether a page, whose page print image is to be displayed on the display unit, is a page whose print processing is still stoppable.

7. The image forming apparatus according to claim 6, wherein determining whether the page, whose page print image is to be displayed on the display unit, is a page whose print processing is still stoppable, is according to whether a paper corresponding to the page to be displayed is already fed.

8. A method for controlling an image forming apparatus, the method comprising:
acquiring print information from an input print job and generating a preview image for displaying, on a display unit, a page print image of a page to be printed whose print processing is still stoppable; and
displaying the generated preview image on the display unit,
wherein displaying includes adjusting timing for determining whether the page, whose page print image is to be displayed on the display unit, is a page whose print processing is still stoppable, according to whether a paper corresponding to the page to be displayed is already fed, based on a conveyance distance of the paper.

9. The method according to claim 8, further comprising:
receiving a user instruction indicating a page print image of any one instructed page of page print images displayed on the display unit; and
controlling continuation or cancellation of print processing for succeeding pages, including the instructed page whose page print image is displayed on the display unit, according to the received user instruction.

10. The method according to claim 8, wherein displaying includes updating a display status of a page print image of a page whose print processing is still stoppable according to a progress of the print processing.

11. The method according to claim 10, wherein displaying includes determining a number of preview images to be displayed on the display unit based on a set number of view slots.

12. The method according to claim 8, wherein displaying includes displaying page print images of a plurality of pages whose print processing is still stoppable, from a head page, on the display unit.

13. The method according to claim 8, wherein displaying includes determining whether a page, whose page print image is to be displayed on the display unit, is a page whose print processing is still stoppable.

14. The method according to claim 13, wherein determining whether the page, whose page print image is to be displayed on the display unit, is a page whose print processing is still stoppable, is according to whether a paper corresponding to the page to be displayed is already fed.

15. A non-transitory computer-readable storage medium storing a program to cause an image forming apparatus to perform a method, the method comprising:
acquiring print information from an input print job and generating a preview image for displaying, on a display unit, a page print image of a page to be printed whose print processing is still stoppable; and
displaying the generated preview image on the display unit,
wherein displaying includes adjusting timing for determining whether the page, whose page print image is to be displayed on the display unit, is a page whose print processing is still stoppable, according to whether a paper corresponding to the page to be displayed is already fed, based on a conveyance distance of the paper.

16. The non-transitory computer-readable storage medium according to claim 15, the method further comprising:
   receiving a user instruction indicating a page print image of any one instructed page of page print images displayed on the display unit; and
   controlling continuation or cancellation of print processing for succeeding pages, including the instructed page whose page print image is displayed on the display unit, according to the received user instruction.

17. The non-transitory computer-readable storage medium according to claim 15, wherein displaying includes updating a display status of a page print image of a page whose print processing is still stoppable according to a progress of the print processing.

18. The non-transitory computer-readable storage medium according to claim 17, wherein displaying includes determining a number of preview images to be displayed on the display unit based on a set number of view slots.

19. The non-transitory computer-readable storage medium according to claim 15, wherein displaying includes displaying page print images of a plurality of pages whose print processing is still stoppable, from a head page, on the display unit.

20. The non-transitory computer-readable storage medium according to claim 15, wherein displaying includes determining whether a page, whose page print image is to be displayed on the display unit, is a page whose print processing is still stoppable, according to whether a paper corresponding to the page to be displayed is already fed.

\* \* \* \* \*